United States Patent Office 2,727,876
Patented Dec. 20, 1955

2,727,876

COMPOSITION AND PROCESS

Ralph K. Iler, Wilmington, Del., assignor to E. I. du Pont de Nemours and Company, Wilmington, Del., a corporation of Delaware No Drawing. Application March 6, 1952,
Serial No. 275,235

23 Claims. (Cl. 260—37)

This invention relates to new compositions of matter. More particularly, it relates to new compositions comprising elastomers and surface esterified, finely-divided siliceous solids. Still more particularly it relates to new compositions comprising elastomers and surface esterified siliceous solids having specific surface areas of at least one square meter per gram and being in a supercolloidal state of subdivision.

In the field of solution chemistry, i. e., chemical solutes in true solution, physical and chemical behavior of the solute is primarily determined by its chemical structure. In colloidal solution chemistry, i. e., where the dispersed phase is in a state of subdivision too large for true solution but small enough to form stable colloidal dispersions under favorable conditions, the chemical nature of the particles of the dispersed phase is still of major importance, but the nature of the surfaces of the particles of the dispersed phase becomes a significant behavior factor which must be taken into account. When particles of solids are supercolloidal in size, and the specific surface area exceeds a minimum value, the nature of the surfaces is then the major behavior factor, although the internal nature and structure of the particle is still important. Specific surface area is the ratio of exposed surface, as determined by nitrogen adsorption, to the mass of the particle. This is usually expressed in square meters per gram (m.$^2$/g.) or square yards per pound (yd.$^2$/lb.). Surface phenomena of solids become more and more important as the specific surface area increases. A specific surface area of about one m.$^2$/g. can be considered as a threshold value below which we may disregard the surface phenomena. For dense, non-porous, siliceous particles of substantially spherical shape, this corresponds to an average particle diameter of about 2–3 microns. As the particle diameter of such particles decreases, the specific surface area increases. When the specific surface area reaches about 25 m.$^2$/g., or above, the nature of the surface becomes quite significant for most purposes. Where the particle is porous or spongy the gross particle size may have little relation to specific surface area which in many cases will range from 200 to 900 m.$^2$/g.

Amorphous silica, which (unless water has been removed and excluded) is essentially SiO$_2$ having its surface covered with silanol (—SiOH) groups, is well known both in the form of powders and of porous masses (silica gel). The description of silica as having surface silanol groups is based on sound theoretical considerations but is not yet susceptible to absolute proof. It can be argued that the surface is covered with siloxane linkages with water strongly held thereon. Whatever the true theory may be, the surface is reactive and, for purposes of explaining the invention, I shall hereinafter refer to surface silanol groups. Moreover, metal silicates, both mineral and synthetic, are known in the form of finely divided powders consisting of aggregates of needles, rods or plates (bentonite, mica, etc.). All of these siliceous solids of supercolloidal size have significant specific surface areas.

Supercolloidal particles of siliceous solids have found wide utility in many fields. Among other uses, they have been used to fill, extend, thicken and reinforce various organic materials such, for example, as plastics, resins, rubber, oils, etc. They have been used to improve the characteristics of paper, leather, textiles and other organic fabrics. The usefulness of these siliceous solids has been hampered and retarded by their surface characteristics. The surface silanol groups have strong affinity for water. They either have relatively low affinity for organic materials or actually are non-compatible with them. These siliceous solids having surface silanol groups would be greatly improved by increased affinity for organic solvents, i. e., by the introduction of chemically bound surface groups to render them organophilic. Still greater improvements for many purposes would be obtained by the introduction of chemically bound surface groups to render them not only organophilic but also repellent to water, i. e., hydrophobic. Other workers in the art have surface-treated finely-divided siliceous materials with various substances to render them organophilic or hydrophobic, but, so far as I know, no economically practicable products have been made.

In my United States Patent 2,657,149, issued October 27, 1953, on application Serial No. 315,930, filed October 21, 1952, as a continuation-in-part of my then copending application Serial No. 171,759, filed July 1, 1950, now abandoned, there is disclosed a whole new class of materials made by chemically reacting primary and secondary alcohols having 2 to 18 carbon atoms with siliceous solids in a supercolloidal state of subdivision and having at least one square meter of surface area per gram of siliceous substrate whereby the resulting product is organophilic or organophilic and hydrophobic. This reaction I have called esterification and the chemically bound —OR groups (where R is a hydrocarbon radical) resulting therefrom I have called ester groups. The esterified products I shall call "estersils." Broadly defined, an estersil is an organophilic solid in a supercolloidal state of subdivision, having an internal structure of inorganic siliceous material with a specific surface area of at least 1 m.$^2$/g., having chemically bound to said internal structure —OR groups wherein R is a hydrocarbon radical, wherein the carbon atom attached to oxygen is also attached to at least one hydrogen, each —OR group having from 2 to 18 carbon atoms.

In the art of reinforcing elastomers with finely divided pigments it has hitherto been quite difficult to obtain complete dispersion of the filler particles if those particles have had diameters smaller than 17 or 18 millimicrons. This difficulty has precluded the successful commercial use of many otherwise suitable materials. Furthermore, a serious decrease in reinforcement as compared to the optimum is generally realized with conventional fillers when the loading is increased above 30 to 35 volumes per hundred volumes of elastomer and the quantities of such fillers which may be used in fully reinforced stocks is thus limited. A further difficulty encountered with highly adsorptive fillers such as the silica fillers heretofore available is that excessively large quantities of vulcanization accelerators are required to produce fully cured stocks with conventional formulations employing appreciable quantities of such fillers.

It is an object of this invention to provide novel compositions comprising an elastomer and an estersil. A further object is to provide an elastomer reinforced with an estersil. Another object is to provide an elastomer in which a silica filler is uniformly dispersed by reason of being present as an estersil. Another object is to provide an elastomer in which silica containing ultimate particles less than about 18 millimicrons is dispersed in the form of an estersil. Another object is to provide an elastomer in which above about 30 to 35 volumes of an estersil is dispersed per hundred volumes of elastomer without serious decrease in optimum reinforcement. Another object is to provide elastomers which contain siliceous fillers and which have been vulcanized without the use of excessive amounts of accelerators by reason of the siliceous fillers being in the form of estersils. A special object of the invention is to provide a silicone elastomer containing an estersil. Another object is to provide processes for improving the properties of an elastomer by dispersing an estersil in the elastomer. Another object is to provide processes in which a curable polymeric material is mixed with an estersil and the mixture is cured to produce a reinforced elastomer. Other objects will become apparent hereinafter.

These objects are accomplished by the incorporation of estersils in compositions of matter comprising elastomeric ingredients. The particular proportion of estersil in the composition depends upon the nature of the elastomer and the properties desired in the product. Workers in the art of elastomer compounding will be able to find the proper proportion for a particular result by routine tests, following the same techniques and using the same order of magnitude of proportions used in prior art compositions employing other filling, reinforcing and extending agents.

According to the invention it has been found that estersils having ultimate particles with diameters as low as 5 to 7 millimicrons are readily dispersible in elastomers and that the stocks thus obtained give vulcanizates with extremely high tensile strength, tear resistance and elongation at break, and at the same time low hardness and modulus of elongation. These beneficial results are particularly striking when the elastomer is neoprene.

It has further been found that by esterifying siliceous pigments such as clays and asbestos their elastomer reinforcement properties may be greatly improved at conventional loadings. Moreover through the use of estersils it is possible to load elastomer stocks to higher levels than with other fillers, without the significant losses of reinforcing effects upon the vulcanizates usually encountered at high volume loadings. This permits greater dilution of the elastomers with fillers costing less than the elastomers they replace, without appreciable sacrifices in the strength and toughness of the resulting cured stocks.

According to the invention it has still further been found that through surface esterification to form estersils, the inherently high adsorptive capacity of silica fillers for vulcanization accelerators is greatly decreased; consequently, the vulcanization accelerator requirements of stocks containing estersils as fillers in reinforcing quantities is significantly reduced.

To briefly illustrate the estersils and the method of making them, if a white powder of fine hydrated amorphous silica, i. e., silica having its surface covered with silanol groups, and having a specific surface area of about 300 m.$^2$/g. is reacted with about 15 times its weight of normal butanol at about 118° C. for one hour, and the water content of the system is kept below, say, 0.3% by weight of the alcohol, and the unreacted alcohol is removed by filtering off the surface esterified silica and drying it in a vacuum oven, the resulting fluffy powder has pronounced organophilic characteristics. This can be shown by adding a pinch of the powder to a two-phase system of water and butanol in a test tube, whereupon the powder will seek the alcohol phase in preference to the water phase. Although the powder has been made organophilic, only about 80 ester groups per 100 square millimicrons of surface area of the siliceous substrate have been added. This product is not hydrophobic but merely prefers butanol to water in the above test. By greatly increasing the reaction time or by increasing the temperature to about 175° C. in a closed pressure vessel so that about 225 ester groups per 100 square millimicrons of surface area of the siliceous substrate have been added, the product is made hydrophobic. If a pinch of this powder is added to water in a test tube, it will refuse to enter the water and will remain on top of the water. Even in this product the surface of the powder is not completely crowded with ester groups as can be shown by the fact that the product will adsorb methyl red dye from benzene solution on the areas not blocked by ester groups. In this particular case, roughly 10% of the specific surface area as determined by nitrogen adsorption is still free to adsorb the dye. If, however, the reaction temperature is raised to 225° C. the surface will have about 270 ester groups per 100 square millimicrons. Now the product is not only organophilic and hydrophobic but its surface is so crowded with ester groups that there is left practically no space large enough to permit methyl red dye molecules to become attached to the surface, and the dye adsorption is essentially zero within the accuracy of the method for its determination. All of these surface esterified materials are organophilic, the latter two products are hydrophobic, and the last described product (zero dye adsoprtion) is especially outstanding in its ability to withstand assaults of water under rigorous conditions.

The materials which are esterified according to the process of this invention form the skeletons or internal structures of the new products which are made by the esterification process. These materials are in the solid state. They are siliceous. They can be amorphous silica. They can be water-insoluble metal silicates. They can be water-insoluble metal silicates coated with amorphous silica. In any event they must have surface silanol groups (—SiOH) and preferably their surfaces are substantially covered with silanol groups. These materials are inorganic. They contain substantially no chemically bound organic groups.

The inorganic siliceous solids are in a supercolloidal state of subdivision. They are too large to form a stable colloidal solution which will pass through a filter. Colloidal solutions are usually defined as those solutions in which the solutes have particle diameter in the range from 1 to 100 millimicrons. As the particle diameter increases over 100 millimicrons, the solute shows an increasing tendency to settle where the solute and solvent have different densities. When any one dimension of a solute particle is 150 millimicrons or greater this tendency is so marked that there can be little doubt that the particles are supercolloidal. Accordingly, by a supercolloidal state of subdivision, I mean that the particles of the inorganic siliceous solid have at least one dimension of at least 150 millimicrons. In most cases, the solids I have worked with consisted of coherent aggregates which had an average particle diameter of at least 1 micron. At this size, or above, the inorganic siliceous solid is readily removed from suspension in liquid medium by filtration. Once a filter cake is formed on the filter, the cake tends to trap particles down to about 150 millimicrons in one dimension. Smaller particles tend to pass through the filter.

If the solid is non-porous (devoid of pores large enough to permit penetration by nitrogen molecules) it must be finely divided. If the solid is subdivided into substantially spherical non-porous particles, the average particle diameter must not exceed about 2–3 microns.

Preferably, inorganic siliceous solids having numerous pores, voids or interstices therein are used. These materials are porous. By this I mean that they have exposed surfaces in the interior of the lump or particle which are connected to the exterior so that liquids and gases can penetrate the pores and reach the exposed surfaces of the pore walls. In other words, the solid forms a three-dimensional network or webwork through which the pores or voids or interstices extend as a labyrinth of passages or open spaces.

Especially preferred are porous inorganic siliceous solids having average pore diameters of at least four millimicrons.

It is preferred to use, as the inorganic siliceous solid, amorphous silica in the form of supercolloidal aggregates in which the pores or spaces between the ultimate units have an average diameter, as determined from nitrogen adsorption curves, of at least 4 millicrons. When the pores are smaller than this, the higher alcohols, particularly the $C_{18}$ straight-chain alcohol in which the molecule is around 2 millimicrons in length, penetrate the pores with difficulty, and when attached to the exposed surface of the pore walls must fill them almost completely.

In silica aggregates or gels in which the average pore diameter is smaller than about 4 millimicrons, the structure, i. e., the bonds between the ultimate units, is so hard and strong that comminution is extremely difficult, and in fact cannot be accomplished by practical means. Such material can still be reacted with alcohols, such as ethanol or normal butanol, in such a way as to cover the external walls and most of the internal walls of the supercolloidal aggregates, but if this structure is broken apart by extreme mechanical means, the freshly formed silica surfaces which are formed by fracturing the aggregate structure, and which are hydrophilic, amount to such a high percentage of the total final surface that the disintegrated product has a relatively large proportion of unesterified surface.

On the other hand, where the supercolloidal aggregates have a looser structure and contain pores of at least about 4 millimicrons average diameter, the surface is easily accessible to alcohol, and the structure is ordinarily weaker, mechanically. These coarser pores may be the result of a much looser packing of small ultimate units which may be, for example, 5 to 10 millimicrons in diameter, or the pores may be large due to the fact that the ultimate units are larger, for example 20 or 30 millimicrons in diameter, and therefore the spaces between the ultimate spherical units are naturally larger even in closely packed structures.

The skeleton or internal structure of inorganic siliceous solid can be dense, siliceous particles as long as they have a specific surface area of at least 1 m.²/g. However, the preferred internal structure is a porous coherent aggregate of very small ultimate units.

One embodiment of great value is a coherent aggregate wherein the ultimate units are dense, non-porous spherical amorphous silica having average diameters in the range of 10 to 100 millimicrons. Such aggregates, by virtue of the size of the ultimate units, of necessity have a labyrinth of pores, averaging at least about 4 millimicrons in diameter, therein and have specific surface areas of at least 25 m.²/g. The ultimate units cohere through siloxane bonds formed prior to esterification. By further deposition of silica the bonds can be strengthened. Aggregates in which the bond strength corresponds to coalescence factors ($S_c/S_n$) between 0.9 and 1.3 are preferred. Less strongly coherent units have value for some purposes but have the disadvantage of giving a less rigid structure. Also, higher coalescence factors are not preferred for some uses since they make it very difficult to comminute the aggregates (which are often 1 to 10 microns or larger) into smaller particles, which latter are desirable, for example, when the products are used in organic coating compositions, plastics, oils or the like. In other words, the preferred powders permit the making of compositions of organic materials strengthened or reinforced or thickened by tiny structured siliceous skeletons. Ultimate structural units of 15 to 30 millimicrons are especially preferred because of ease of processing and effectiveness.

Another valuable embodiment has an internal structure of amorphous silica units so tiny as to give a specific surface area of at least 200 m.²/g. which units are joined in coherent aggregates. For most purposes, a specific surface area of about 900 m.²/g. is a practical upper limit. However, the range of about 200 to 600 m.²/g. is a preferred range because such products have a balanced proportion of inorganic internal structure to ester groups giving excellent reinforcing and filling properties together with outstanding compatibility for organic material. Preferably these coherent aggregates have such an open network structure as to have an average pore size of at least 4 millimicrons diameter. When pores of this size are present in the esterified particles, the further reduction in size of the particles by comminuting, grinding, milling, etc. can be accomplished without destroying the organophilic characteristics of the material. This is because the ratio of esterified surface to the new surfaces generated by comminution is so great that the new surfaces have negligible effect on the total surface characteristics of the products.

Since the esterification of the estersils is a surface phenomenon, the effectiveness of the treatment may be measured by calculating the esterification in terms of the number of ester groups per 100 square millimicrons surface area of the internal structure. Thus, the esterification value "E" may be defined as the number of —OR groups per one hundred square millimicrons of surface area $$E = \frac{6.02 \times 10^{23} \times C}{12n \times S_n \times 10^{18}} = \frac{50200 \times C}{n \times S_n}$$

where C is the weight of carbon in grams attached to 100 grams of siliceous substrate, $n$ is the number of carbon atoms in the —OR groups, $S_n$ is the specific surface area in m.²/g. of the siliceous substrate as determined by nitrogen adsorption.

Where the type of alcohol used in esterification is known, a carbon analysis and the specific surface area of the siliceous material which is esterified are all that is required in order to calculate the surface esterification. On the other hand, where a sample is to be analyzed in which the type of alcohol is unknown, the sample can be decomposed with an acid and the alcohol can be recovered and identified so that the number of carbon atoms in the alcohol can be determined. The specific surface area of the siliceous substrate may be determined after burning off the ester groups as explained hereinafter, and the surface esterification thus established in the above manner. As an example of this method, 15 grams of a highly esterified hydrophobic silica powder was boiled for 36 hours in 250 cc. of 0.1 Normal HCl. The powder was filtered off and the filtrate was neutralized with alkali and distilled through a fractionating column. The distillate first obtained boiled at 93° C., corresponding to the boiling point of the butanol-water azeotrope (92° C.), and the head temperature rose rapidly thereafter. About 5 cc. of condensate was collected which was analyzed and found to consist of a mixture of water and normal butyl alcohol. Another sample of the same esterified product was analyzed for carbon which analysis gave a value of 6.70%; 6.70% carbon corresponds to 7.3 grams of carbon attached to 100 grams of siliceous substrate. On a third sample the specific surface area of the substrate was determined and found to be 310 m.²/g. From this data the number of ester groups (known to be butoxy) per 100 square millicrons of surface area of the internal structure was computed by the above formula and found to be 296.

In order to render a siliceous material organophilic, it is necessary to react a certain minimum proportion of the surface silanol groups with an alcohol. The esterified silica is markedly organophilic when there are present on the surface more than about 100 ester groups per 100 square millimicrons of the internal structure. As will be explained below, there are certain alcohols which may be used, in which organophilic products may be obtained with even fewer ester groups on the surface, but for most alcohols no more than 80 ester groups per 100 square millimicrons of the internal structure are required in order to insure organophilic character in all cases.

A hydrophobic product usually requires at least 200 ester groups per 100 square millimicrons of surface based on nitrogen adsorption measurements on the unesterified surface.

Various siliceous substrates surface-esterified with various alcohols, and numerous esterification processes, as well as methods for characterizing the products, are described in my above-identified United States Patent 2,657,149, and that disclosure is incorporated herein by reference in lieu of a detailed repetition thereof. Additional techniques for characterizing the products, not mentioned in said patent, are the following:

OPENNESS OF PACKING OF SILICA SUBSTRATES

Linseed oil absorption gives an indication of the openness of packing of the ultimate units in silica aggregates. The more open the packing, the greater the oil absorption. The test may be carried out as described in A. S. T. M. Standards for 1949, vol. 4, p. 169. A 0.5–1.0 gram sample of the powder which has been dried at 110° C. is placed on a glass plate and raw linseed oil is added drop by drop, the mixture being stirred and gently mashed by means of a steel spatula until crumbling just ceases, and the product can be molded into a ball. As the sample of powder is titrated with oil, the oil penetrates the pores of the powder, filling all void space, both intra- and inter-aggregate. The powder remains essentially dry in appearance until the pores within the aggregates are filled, and then becomes increasingly cohesive as the voidage between the aggregates is filled. At the point that all free space is filled, the material loses its friable nature and can be molded into a ball. The amount of oil required in the test may be expressed in terms of ml. of oil per 100 grams of powder. For the products of this discussion, the oil absorption depends upon the openness of packing of the ultimate units and the specific surface area. By comparing oil absorption at constant specific surface area, a measure of the openness of packing can be obtained. In a preferred embodiment of this invention the estersil used may have an oil absorption expressed in milliliters of oil per 100 grams of powder of from 1 to 3 times the specific surface area expressed in square meters per gram.

EXTENT OF REINFORCEMENT OF SILICA AGGREGATES

An important factor determining the nature of some of the silica substrates used in making estersils is the extent of reinforcement of the aggregates or the strength of bonding between the ultimate units in the three-dimensional network. The places where the ultimate units in a gel adhere to each other have been referred to in the art as "junction points," but the forces by which the ultimate units may be held together at these "junction points" are not commonly understood. In the case of the silica aggregates which are reinforced by accretion of silica, the ultimate units become cemented together at the "junction points." I have called this cementing action "coalescence." The degree of coalescence may be measured by a controlled depolymerization of the silica, measuring what per cent of the silica must be dissolved before the aggregates disintegrate to the ultimate units which disperse to a colloidal sol; this is called the "coalescence factor."

A test has been devised in order to determine this factor. The sample, properly prepared, is suspended in and permitted to dissolve slowly in a dilute solution of alkali. In the course of this dissolution, the course of the disintegration of the aggregates is observed by noting the decrease in the turbidity of the suspension. The aggregates, being supercolloidal in size, cause the suspension to be initially turbid; as the aggregates are disintegrated the turbidity of the suspension decreases and the transmission of light through the suspension increases. Simultaneously the amount of silica which has passed into solution is determined analytically. From a curve obtained by plotting the percentage transmission of light through the suspension versus the per cent silica which has dissolved at the corresponding moment, the coalescence factor is determined as hereinafter described. This test is applicable to siliceous substrates having a specific surface area in the range of 60–400 M.$^2$/g.

The coalescence factor is determined by the following method: The specific surface area is measured by nitrogen adsorption, as already described. To free the dry powder from organic matter, a sample is ignited in a vertical tube in a slow stream of air, increasing the temperature in one hour from 250–450° C. Further ignition for 30 minutes at 450° C. in pure oxygen is employed to remove last traces of organic matter. Acid soluble components are removed by leaching the ignited sample (or a sample free from organic matter) in hot (80–85° C.) 2 N HCl for 30 minutes and then washing to a pH of 4 with a minimum amount of water to remove any metal ions. Solids content of the resulting wet silica is determined by evaporation and ignition (to 450° C.) of a separate weighed sample.

The coalescence determination is carried out on a sample of the wet silica substrate containing 1 gram of solids. The sample is diluted to 100 ml. with water, warmed to 50° C. in a stirrer equipped flask, and titrated with 1.0 N NaOH. Sufficient base is added immediately to raise the pH to about 11.2 (1.0 ml. per 90 M.$^2$/g. of specific surface area, but not less than 1.5 ml. nor more than 4 ml.), and further steady addition is maintained at such a rate as to hold the pH as close as possible to 11–11.5. During this treatment, depolymerization, or solution of polymeric silica, occurs because of the presence of hydroxyl ions. The product of this depolymerization is monomeric sodium silicate. The reaction of this monomeric silicate with acid molybdate reagent prepared from ammonium molybdate and sulfuric acid results in the formation of a yellow silico molybdate complex, $SiO_2 \cdot 12MoO_3 \cdot xH_2O$. It has been demonstrated that the color intensity of this complex is proportional to the amount of monosilicic acid which has reacted with the molybdate reagent. Not only does the molybdate reagent react rapidly with monomeric silicic acid, but the acid nature of the reagent practically arrests depolymerization of any high molecular weight colloidal silica present when an aliquot of the silica sample is mixed with the acid molybdate reagent. The reaction of this agent with monosilicic acid can therefore be used to determine the amount of monomer present in the depolymerizing solution at any given time.

Percentage transmission and percentage monomeric silicate are measured as frequently as possible during the depolymerization treatment. Transmission is measured by means of a Beckman Quartz Spectrophotometer, Model DU at a wavelength of 400 millimicrons and with a cell length of 1 cm. In making the analysis for monomeric silicate, a 0.1 ml. aliquot from the depolymerization medium is diluted to 50 ml. with a freshly prepared 0.1 N $H_2SO_4$ solution of ammonium molybdate (this solution contains 4.0 g. of $(NH_4)_6Mo_7O_{24} \cdot 4H_2O$ per liter) and the optical density of the resulting solution is measured on the spectrophotometer. Distilled water is used as the reference solution for these measurements. The depolymerization is followed in this manner until about 80 or 90% of the total silica has been dissolved. This may be estimated from the fact that the sample was chosen to contain about 1.0 mg. of silica, and under the conditions of this experiment, if all of the silica were in the form of monomer, the optical density would be 0.72. To determine the total silica content of the aliquot taken, the solution is made 0.5 N in NaOH and heated in live steam in an alkali-resistant flask for at least 2 hours, so that the last traces of silica are depolymerized to monomer. Total silica is then determined by the molybdic acid method above, and percentage silica at any point during the depolymerization is determined from the ratio of the optical density at that point to the optical density after all the silica in the sample was converted to monomer.

For samples composed of substantially spheroidal, dense ultimate particles which are aggregated or reticulated, the percentage of silica involved in the bonding or coalescence of these ultimate units is shown by the position of the inflection point in a plot of percentage soluble silica versus transmission.

The percentage soluble silica at the inflection point is termed the "coalescence factor" of the sample. In a preferred embodiment, the siliceous substrates which are esterified to make estersils have a coalescence factor of from 30 to 80%.

SPECIFIC DEPOLYMERIZATION RATE

A test which gives a measure of the density of the ultimate particles in the siliceous substrate is the specific depolymerization rate, K. This is determined by treating the silica with 0.01 N sodium hydroxide solution at 30° C. and measuring the rate of monomer formation, i. e., the rate of depolymerization.

The specific depolymerization rate is defined as ten thousand times the rate of monomer formation per minute, divided by the specific surface area of the depolymerizing particles at the time of measurement of rate of monomer formation. Stated mathematically, $$K = \frac{10^4 \times (dm/dt)}{S_n (1-m)^{2/3}}$$

where K is the specific depolymerization rate, $(dm/dt)$ is the rate of monomer formation per minute, $S_n$ is the original specific surface area of the silica tested, and $m$ is the fraction of total silica converted to monomer at the time, $t$.

The depolymerization is measured with the molybdate reagent, as already described for the measurement of active silica and for the determination of the coalescence factor. The measurements are carried out on the dry silica powders from which organic matter has been removed as described above, the procedure consisting in acid-washing with hot concentrated hydrochloric acid to remove surface adsorbed metal ions, followed by small successive portions of distilled water, followed by acetone washing and drying at 110° C. Twenty milligrams of the dried powder are then accurately weighed and transferred to 100 milliliters of 0.01 N sodium hydroxide solution maintained at 30° C. The slurry is agitated vigorously by bubbling with nitrogen gas saturated with water vapor at 30° C. At appropriate intervals, determined by the rate of depolymerization, usually between 5 and 90 minutes, 5 milliliter aliquots are withdrawn from the depolymerizing solution and mixed with 45 milliliters of the freshly prepared molybdate reagent. The optical density measurements are made with the Beckman spectrophotometer, at a wavelength of 400 millimicrons and with a cell length of 1 cm., as already described for the determination of active silica. The amount of monomer present at any time can be calculated from the optical density reading by comparison with the final color for complete depolymerization (100% monomer).

Six to eight monomer-time readings are taken during the time that approximately half the sample is depolymerized. Total silica is analyzed in the same manner as already described, by heating the solution to 90–100° C. until complete depolymerization of the sample has occurred, as is shown by the absence of variation between consecutive analyses.

From a knowledge of the time intervals at which the monomer concentrations were measured, and of the amount of silica present as monomer at these time intervals, a graph of the monomer concentration vs. time can be constructed. The per cent silica present as monomer is usually plotted as the ordinate, while the time in minutes is plotted as the abscissa. The slope of the line so obtained can then be used to calculate the rate of monomer formation per minute. The specific depolymerization rate, K, is then calculated as described above. In one preferred embodiment silicas used to make estersils have a specific depolymerization rate of from 5 to 20, at a point where 30% of the silica has been depolymerized to monomer, i. e., $m=0.30$. Products in which the silica is not dense due to the presence of tiny pores or imperfections in the ultimate units, may have K values as high as 100. In the preferred embodiment just mentioned, the ultimate units and accredited silica are both dense.

UNIFORMITY OF THE STRUCTURE

In one preferred embodiment, the siliceous substrates used for making estersils are reinforced aggregates in which silica has been accredited substantially uniformly on the entire structure, and the ultimate units are of a relatively uniform size. The uniformity of the structure may be demonstrated in the process of carrying out the measurement of the coalescence factor by controlled depolymerization of the silica. Thus, the per cent transmission of the sample is measured with the Beckman spectrophotometer at a wave length of 400 millimicrons and with a cell length of 1 cm., after 90% of the total silica has been dissolved, using water as the reference liquid. The percentage transmission as measured in this way is termed the "uniformity factor." If the uniformity factor of the sample is greater than 75%, the sample is substantially uniform. In cases where the reinforcement of the structure is non-uniform, the depolymerization test will cause depolymerization of the structure at the weakest, least reinforced points first, and will not disrupt certain of the highly reinforced points even after 90% of the total silica has been dissolved. Consequently, a number of large fragments of the structure remain at this point, substantially reducing the transmission of the sample.

The uniformity of the structure can also be observed by means of the electron microscope. This method shows that the ultimate units are of a uniform size and that the "junction points" between ultimate units are reinforced to a uniform degree.

THE ELASTOMER COMPOSITIONS

Now in the present invention an estersil, such as described above, is incorporated into an elastomer to give a novel and improved elastomeric composition. Any elastomer may be improved with regard to one or more of its properties, but it will be understood that the effect of estersils will be more pronounced with some elastomers than with others, and different properties of the elastomer may be improved in varying degrees.

Estersils can be incorporated into elastomer products at any stage in manufacture, including the original formation of the polymer. The elastomer in which estersils are incorporated according to this invention may be any rubber-like polymeric material. The term "elastomer" is a general descriptive term for this class of products and may be regarded as an abbreviation for "elastopolymer" or "elastic polymer." (See "Advances in Colloid Science," volume 2, 1946, at page XXV.)

More specifically, by the term "elastomer" is meant "a material which at room temperature can be stretched repeatedly to at least twice its original length and upon immediate release of the stress will return with force to its approximate original length." This accepted definition is found in Modern Plastics Encyclopedia, 1950 edition, at page 30. As here used it may be understood to cover the high molecular elastic colloid, natural caoutchouc, as well as synthetic rubbers and rubber-like materials such as neoprene, butyl rubber, silicone rubbers, and the styrene-butadiene copolymers commonly known as GR–S types.

Representative elastomers which may be modified with an estersil according to the present invention may be conveniently classified into the following groups:

Natural rubbers, such as *Hevea brasiliensis*, Pará rubber, and other recognized species.

Synthetic rubbers, including rubber-like diene hydrocarbon homopolymers, and copolymers, for example, of butadiene, isoprene, 2,3-dimethyl-butadiene and the like; also copolymers of such dienes with other polymerizable vinyl or vinylidene compounds such as styrene, α-methylstyrene, 2,5-dichlorostyrene acrylonitrile (sold under the trade-names of "Hycar," "Chemigum," and "Perbunan"), methacrylonitrile, methacrylic and acrylic esters (such as methyl, ethyl or higher esters), vinyl ethinyl carbinols (such as dimethyl (vinylethinyl) carbinol), methyl vinyl ketone, methyl isopropenyl ketone, 2-vinyl pyridine, 2-methyl 5-vinyl pyridine, 2-vinyl-5-ethyl pyridine, vinylidene chloride, and the like.

Synthetic rubber-like materials, including rubber-like haloprene polymers and copolymers, for example of chloroprene, 2,3-dichlorobutadiene, bromoprene, and fluoroprene, and copolymers of haloprenes with diene hydrocarbons or with other polymerizable vinyl or vinylidene compounds such as those cited above. Specific examples of this type of elastomer are Neoprene GN, Neoprene Type W, and Neoprene Type FR.

Isobutylene copolymers, including copolymers of isobutylene with such diene hydrocarbons as butadiene, isoprene, or piperylene. Certain coplymers of this type are known as GR–I.

"Thioplasts" (polysulfide rubbers), such as those obtained by the reaction of ethylene dichloride or dichloro diethyl ether with sodium polysulfide, and commonly known as "Thiokols."

Silicone rubbers, including organosiloxane polymers made up of polymer units of the type $R_n SiO_{4-n}$, wherein R is a monovalent organic radical bonded to the silicon by a carbon-silicon linkage, the polymers having various degrees of cross-linking.

More particularly, some of the elastomers included are butadiene copolymerized in various ratios with styrene, butadiene copolymerized in various ratios with acrylonitrile, polymerized butadiene, polymerized isoprene and 2,3-dimethyl butadiene, polymerized 2-chlorobutadiene, 1,3-isobutylene copolymerized with butadiene or isoprene, copolymers of butadiene and methylmethacrylate, butadiene copolymerized with methylvinyl ketone, and various other copolymers of butadiene with ethylenically-unsaturated monomers. It will be noted that the invention is applicable to diene elastic polymers as a class. New types of elastomers, including polyester rubbers such as polyethylene glycol adipate rubbers, can be modified by estersils. Polyester rubbers will be understood to include polyesteramide-type elastomers. Also included are elastomeric materials of the polyacrylic ester type known in the trade by such names as "Hycar PA."

The estersil can be added to a latex of the elastomer, that is, an aqueous dispersion of the elastomer. The latex and the estersil can then be coagulated, resulting in the formation of the solid elastomer composition containing the dispersed estersil.

Although for some applications incorporation of estersils with the elastomers in the form of latex is advantageous, for the majority of uses preferred estersil-elastomer compositions are obtained by milling the estersil into the solid elastomer in a conventional manner. The estersils can either be added to the latex, coagulated and the resulting crumb dried and milled, or the dry estersils may be added directly to the elastomers on the rubber mill.

The mill compounding of elastomers with estersils can be carried out by practices commonly used in the rubber industry. The rubber is first broken down, if necessary, by milling on open mills or with internal mixers, and thereafter the estersil and other ingredients, including softeners, curing or vulcanizing agents, and other well known compounding agents are added in conventional manner. After an initial milling the stock can be allowed to rest 12 to 24 hours at room temperature and then return to the mill and milled briefly to ensure thorough dispersion of curing agents and fillers. The stocks so prepared can then be vulcanized by methods commonly used in the rubber industry.

Estersils may be milled into silicone rubbers for strengthening and reinforcing effects. They may also be incorporated into the organosilicon oils and low molecular weight intermediates which are subsequently polymerized to form silicone rubber.

The silicone elastomers or rubbers in which estersils may be incorporated according to this invention include products which have been referred to by such terms as dimethyl silicone elastomers, methyl silicone elastomers containing silicon-bonded vinyl radicals, methyl siloxane elastomers, dimethyl silicone elastic gums, methyl siloxane elastic gums, rubbery polymeric organo-siloxane compositions, methyl-substituted polysiloxanes, organosiloxane elastomers, elastic methylpolysiloxanes, and siloxane elastomers.

The silicone rubbers may be prepared by techniques with which the art is already familiar. The usual practice involves the controlled hydrolysis of hydrocarbon-substituted silicon halide, such as dimethyl dichlorosilane, to give a silicone oil, followed by further, controlled polymerization of the oil to an elastic gum. The gum so obtained may be further treated with curing agents such as benzoyl peroxide and may be mixed with fillers to give elastomers or rubbers of the desired properties. The estersils may advantageously be incorporated while the elastic gum is being formed or thereafter.

More particularly, the preparation of silicone oils suitable for further polymerization to elastic gums is described in Warrick Patent 2,481,052, at column 1, lines 30 to 52. Dimethylsilicones are described in Agens Patent 2,448,756 at column 1, line 21, to column 2, line 19. Generally, the ratio of organic radicals to silicon atoms is from 1.5 to 2.25, and when the organic radicals are methyl groups this ratio is preferably from 1.98 to 2.00. The ratio is controlled by proper selection of the mixture of silanes hydrolyzed, since little if any change in the organic radical-to-silicon atom ratio takes place during hydrolysis. Phenyl-substituted silicones are disclosed in Sprung Patent 2,484,595, and vinyl-substituted products are shown in British Patent 618,451. To the extent that such products are further polymerizable to elastic gums they may be used as starting materials.

The silicone oils are further polymerized or condensed to make gums which can be converted to elastomers. The polymerization may be initiated and/or accelerated by mixing suitable catalysts with the silicone oil and heating, say to 130° C. A number of such condensation catalysts are disclosed in Sprung Patent 2,484,595. For further detail regarding such use, as catalysts, of ferric chloride, aluminum chloride plus ferric oxide, or tricresylphosphate, see Agens Patent 2,448,756; of sulfuryl halide, see Safford Patent 2,454,759; of benzoyl peroxide, see Warrick Patent 2,460,795; of sulfuric or chlorosulfonic acids, see Marsden and Roedel Patent 2,469,883; of organic phosphorus halides, see Sprung Patents 2,472,629 and 2,492,129; and of sodium hydroxide, see Marsden Patent 2,546,036.

The properties of some silicones may advantageously be modified by condensing other silicones therewith. Controlled cross-linking of the polymer may thereby be achieved. Co-condensations are described, for instance, in Sprung Patent 2,484,595, and Sprung and Burkhard Patent 2,448,556.

The elastic gums obtained as above described may be "cured" or "vulcanized" by further heating and treating with curing or vulcanizing agents to give elastomeric products. The cure may be effected under pressure to avoid inclusion of gas bubbles and consequent spongy product. Active fillers, such as lead oxide, may also be incorporated into the mixture being cured (see British Patent 594,506), and may be worked in by milling, as on a differential roll rubber mill. Elastic gums which are suitable for such further curing are available, for instance, under such code desginations as "SE-76" and "GE-silicone gum 9979-G," from the General Electric Company.

As curing agents a considerable number of materials are effective. Typical of such agents are the organic peroxides as disclosed in Jones Patent 2,448,530 at column 1, lines 30 to 40 and column 6, lines 41 to 53; more particularly the acyl peroxides as shown in Warrick Patent 2,481,052; and especially benzoyl peroxide as shown in Wright and Oliver Patent 2,448,565. Organic metallo compounds, such as triphenyl stibine, dimethyl mercury, tributyl tin acetate, tetraethyl lead, tetraphenyl bismuth, lead tetraacetate, and mercury acetate may be used as described in Warrick Patent 2,480,620. Other curing agents are the zirconyl nitrate of Wright Patent, 2,453,562, the tertiary butyl perbenzoate of Warrick Patent 2,541,137, and the tertiary butyl peracetate of Warrick Patent 2,572,227. Mercury, its oxides, and its salts may be used in combination with the peroxide curing agents, as shown in Jones Patent 2,448,530.

Now according to the present invention, an estersil may be incorporated into a silicone during the formation of the elastic gum or thereafter. It is customary to mill silicones with catalysts during the polymerization to form elastic gums, as shown in Agens Patent 2,448,756, and estersils may advantageously be milled into the silicone at this stage. The art is also familiar with techniques for incorporating fillers into silicone elastomers preliminary to or during the curing stage, and any of such techniques may be used. The filler curing agent, and other additives, if any, may be added to the gum while working it on differential rubber rolls at a temperature of, say, 75° C. A process of curing a silicone in which a filler is employed in the curing step simultaneously with other agents is described, for instance, in Jones Patent 2,448,530, column 4, lines 5 to 49. The suitably compounded mix is usually subjected to a pressure cure, after which it is further cured at elevated temperatures. It is customary in the art to use the term "silicone rubber" to describe a silicone gum which has been compounded with a filler and thereafter vulcanized or cured, and this usage has been observed in the foregoing description.

Other fillers may be used in combination with estersils to reinforce silicone rubbers. The mercury compounds of Jones Patent 2,448,530 tend to give lower compression sets at elevated temperatures and hence may often be included to advantage. If the polymerization catalyst or curing agent is an acid material or forms an acidic material during the processing steps, it is often advantageous to include as a filler a material capable of neutralizing acids, such as lead oxide. Similarly, other materials may be included as secondary fillers to achieve specific effects.

The silicone containing an estersil filler may be extruded or molded in any desired shape prior to the final curing. Again, the art is already familiar with the techniques involved.

The proportion of estersil used in silicone rubbers may be considerably varied, depending upon the type of silicone used, properties desired in the finished rubber or elastomer, the particular estersil selected, and other such factors. Generally it will be found that advantageous properties are developed in the range of 25 volume loading, but the optimum proportion may be more or less than this amount. Normally, beneficial results may be obtained in the range of 5 to 200 volumes of estersil per hundred volumes of silicone, but even larger loadings may be used for particular purposes.

Silicon rubbers containing estersils are particularly adapted for such uses as gaskets, electrical insulation, tubing and sheeting, and extruded and molded parts, especially where service involves unusually high or low temperatures.

Incorporated into rubber cements, estersils give a stronger bond and in effect give a reinforced rubber adhesive. When mixed into rubber cement used on materials such as paper, the addition of estersils to the cement, especially when dispersed by ballmilling or colloid milling, reduces the tackiness of a dried cement coating, yet does not prevent adhesion between two cement-coated surfaces when brought together to form a bond. Naturally, in this application the estersil should be incorporated into the cement and not applied as a powder to the surface of the freshly dried cement, except in very minute amounts, since otherwise bond formation will be interfered with.

Estersils can be incorporated into elastomer fibers, in amounts ranging from a trace up to high percentages, depending upon the effects desired. Estersils can be incorporated, for instance, into fibers of rubber, neoprene, and all synthetic elastomeric organic polymer compositions capable of being formed into threads or fibers. The estersils can be incorporated into the fibers in various ways, including dispersion in the polymer latex prior to forming threads, dispersion in polymer solutions prior to wet or dry spinning, or by incorporation into polymer sheeting by milling, the sheeting being subsequently slit into ribbons or threads. In relatively small amounts, the estersils have only moderate effects on the physical properties such as tensile strength and stiffness. In larger quantities, the fiber or thread modulus is increased and the tensile strength at break is much higher than that of the unmodified material, unless the optimum loading is exceeded. Estersils can be incorporated into fibers, threads, and ribbons of all types for whatever use, including fibers of large diameter such as bristles, where the distributing action of the estersils at high loading is particularly advantageous.

Estersils can be applied also to the surface of elastomer fibers. Not only can the estersils be applied as a surface coating on individual fibers, but can also be impregnated into twisted threads and woven textiles. Estersils can be incorporated into elastomer textile materials, not only in the form of individual fibers and woven goods, but also knitted, felted, or resin-bound fibrous products, and pile fabrics.

Estersils can be incorporated into elastomer textile products at any stage in the processing, from the initial separate fibers or monofilaments through the various stages of manufacture to and including the finished textile and fiber products. For example, the estersils can be applied to the surface of fibers immediately after forming, either in the form of a suspension in a liquid or as a dry dust. The estersils can be applied to elastomer fibers along with binding agents which act as an adhesive and setting agent when heat is applied.

Estersils can be used in the manufacture of components for the television, radio, phonograph, telephone and telegraph industries. Elastomer coatings, such as electrical insulation and thermal insulation, and other functional components, may be modified as described in the above sections.

It is to be understood that, in describing the various elastomer compositions which are improved by the incorporation of estersils, no attempt has been made to mention all of the various additives found in such compositions. Antioxidants, softeners, pigments, accelerators, and a whole host of additives are known in the various arts. Where a particular art is discussed herein and the principal ingredients of the compositions are mentioned, the additives known to the art can also be included in amounts and combinations heretofore known.

The invention will be better understood by reference to the following illustrative examples.

*Example 1.—Preparation of elastomer containing esterified product*

The esterified product prepared as described in Example 1 of the above-mentioned U. S. Patent 2,657,149 was used as a reinforcing agent in an approximately 75% butadiene/approximately 25% styrene co-polymer rubber, known to the trade as Buna S or GR–S, by incorporating it into the rubber along with the customary vulcanizing and curing agents. The character of the product produced is shown in the table below, along with an unfilled sample and a sample filled with ordinary powdered silica gel for comparison.

The compounding of the stocks was carried out by practices commonly used in the rubber industry. The GR–S was broken down on a cold rubber mill until it was sufficiently plasticized to permit the dry ingredients to be incorporated readily. The dry ingredients were then added in the following order: sulfur, zinc oxide, stearic acid, filler and finally the accelerator. The stock was then allowed to rest 12 to 24 hours at room temperature and then returned to the mill and milled briefly to ensure thorough dispersion of curing agents and fillers. The stocks so prepared were then vulcanized by methods commonly used in the rubber industry. Sheets 6 inches x 6 inches x 0.075 inch of these stocks were cured in a steam heated hydraulic press for the length of time and at the temperature indicated in the table below. After aging 25 hours the physical properties of the vulcanizates were determined upon pieces cut from these slabs. Measurements were made by procedures commonly used for testing rubber vulcanizates. The stress-strain measurements were made on a Scott rubber tester. The moduli at 100, 200 and 300% elongation (indicated as $M_{100}$, $M_{200}$ and $M_{300}$, respectively) and the tensile strengths at break ($T_B$) are recorded in the table below in lb./sq. in. The elongation at break ($E_B$) is recorded as per cent of the original length of the sample. Hardness was measured by the Shore durometer, Type A, and is reported below.

The properties of the samples are shown in the following table:

COMPOUNDING FORMULAE AND PHYSICAL PROPERTIES OF GR–S VULCANIZATES CONTAINING FILLERS

|  | I | II | III | IV |
|---|---|---|---|---|
| Compounding formula: | | | | |
| GR–S: | | | | |
| Sample 1 | 100 | 100 | | 100 |
| Sample 2 | | | 100 | |
| Filler | None | | | |
| Esterified product | | | 40 | 44.4 |
| Silica Gel | | 52.4 | | |
| Zinc Oxide | 5.0 | 5.0 | 5.0 | 5.0 |
| Stearic Acid | 1.0 | 2.0 | | 1.0 |
| Sulfur | 2.0 | 2.0 | 2.0 | 4.0 |
| 2-Mercaptothiazoline | | | 1.5 | |
| Tetramethylthiuram monosulfide | 0.5 | 4.0 | | 1.5 |
| Cure: | | | | |
| Time (Minutes) | 40 | 30 | 30 | 75 |
| Temperature (° C.) | 140 | 140 | 148 | 140 |
| Physical properties: | | | | |
| $M_{100}$ (p. s. i.) | 96 | 233 | | 239 |
| $M_{200}$ (p. s. i.) | | 322 | 760 | 487 |
| $M_{300}$ (p. s. i.) | | | 1,210 | 686 |
| $T_B$ (p. s. i.) | 143 | 326 | 1,820 | 1,235 |
| $E_B$ (percent) | 236 | 200 | 410 | 500 |
| Hardness (Shore Type A) | 43 | 56 | | 51 |

It will be observed that the elastomer products containing the esterified product had outstandingly superior physical properties, particularly when compared with equivalent samples containing ordinary dried silica gel as the filler.

*Example 2.—Natural rubber reinforced with esterified silica*

The use of unesterified silicas as fillers for natural rubber is known in the art. Esterification of silica particles which are employed as reinforcing agents for natural rubber has now been found to bring about a marked improvement in the quality of the final vulcanizates, particularly at high pigment loadings. The character of natural rubber stocks reinforced with estersils in illustrated in Table I, and comparisons of such stocks with those containing the unesterified forms of the same silicas are also presented to demonstrate the useful and beneficial effects of esterification.

These data were obtained by examination of stocks which were compounded by dry milling according to the techniques commonly practiced in the rubber industry employing the following formulation:

| Ingredients: | Parts by weight |
|---|---|
| Smoked sheet | 100 |
| Zinc oxide | 5 |
| "Neozone A" | 1 |
| Silica | 60 |
| Stearic acid | 1 |
| Accelerators | as indicated |
| Sulfur | as indicated |

After 24 hours these blends were cured at 287° F. in a steam heated hydraulic press. After an additional 24 hours, rest period at room temperature, their stress-strain and tear resistances were determined according to ASTM procedures using a Scott testing machine. Hardness was measured by the Shore durometer, Type A.

In Table I, the silica of Test A was unesterified and was that prepared as the substrate in Example 6 of U. S. Patent 2,657,149, whereas the final esterified product of said Example 6 was that tested in Test B. The silica of Test C was unesterified "Hi Sil" and of Test D was esterified "Hi Sil," these materials being more fully described as follows:

An amorphous siliceous powder consisting of supercolloidal coherent aggregates of dense ultimate units of from about 22 to 26 millimicrons unit diameter ("Hi-Sil" produced by Columbia Chemical Division, Pittsburgh Plate Glass Co.) was dried to constant weight at 120° C. This material is essentially silica but contains from 1 to 2% by weight of combined calcium. The specific surface area was 100 m.²/g. and the specific hydroxylated surface area was 99 m.²/g. as determined by dye adsorption. The bulk density was 0.175 g./cc. at 3 p. s. i. g.; 0.265 g./cc. at 78 p. s. i. g.; and 0.441 g./cc. at 1560 p. s. i. g. above atmospheric pressure.

A 550-gram portion of the dry material was slurried in 1 gallon n-butanol and the mixture was heated to 250° C. in a 3-gallon stainless steel autoclave under autogenous pressure. The mixture was then cooled to room temperature, filtered and the filter cake was dried at 75° C. in a vacuum oven for 24 hours.

The resulting light, fluffy powder was organophilic and hydrophobic. The specific hydroxylated surface area was 8.6 m.²/g. as determined by methyl red dye adsorption, a 95% reduction as the result of esterification.

TABLE I

| Test No. | Characterization of Silica | | | Test Results on Rubber Stocks | | | | | | |
|---|---|---|---|---|---|---|---|---|---|---|
| | $D_n$ (m$\mu$) | $S_n$ (m.$^2$/g.) | $S_d$ (m.$^2$/g.) | Parts Accelerator | Cure Time, min. | Tensile Strength, p. s. i. | 300% Modulus, p. s. i. | Crescent Tear, lb./in. | Elongation at Break, percent | Hardness |
| A | 25 | 97 | 97 | 2 MBTS and 0.10 Th. M. | 15 | 2,750 | 1,470 | 85 | 480 | 66 |
|   |    |    |    |                        | 30 | 2,670 | 1,500 | 87 | 450 | 71 |
|   |    |    |    |                        | 45 | 2,550 | 1,460 | 102 | 460 | 73 |
| B | 25 | 97 | 5 | ----do---- | 15 | 3,610 | 1,675 | 590 | 580 | 69 |
|   |    |    |    |            | 30 | 3,310 | 1,500 | 632 | 540 | 70 |
|   |    |    |    |            | 45 | 3,150 | 1,425 | 605 | 530 | 70 |
| C | 24 | 100 | 99 | 1 MBTS and 0.25 Th. M. | 30 | 1,650 | 690 | 117 | 540 | 55 |
| D | 24 | 100 | 9 | ----do---- | 30 | 3,250 | 1,625 | 583 | 540 | 72 |

$D_n$ = diameter of ultimate units as measured from electron micrographs.
$S_n$ = specific surface area as determined by nitrogen adsorption.
$S_d$ = specific hydroxylated surface area as determined by dye adsorption.
MBTS = benzothiazyl disulfide.
Th. M. = thiuram M.

Examples 3 to 5 illustrate the vast improvement in the reinforcement properties of silica substrates with high specific surface areas when they are esterified. Extremely high tensile strength, tear resistance and elongation at break are obtained in natural rubber stocks reinforced with esterified aggregates of ultimate silica units having an average diameter in the range of 7 to 10 millimicrons. Examples 6 and 7 indicate that esterification of other siliceous substrates such as clay and asbestos greatly enhance their elastomer reinforcement properties. Example 8 shows the marked reduction in the accelerator requirements of stocks containing estersils as compared with those containing the unesterified modifications. Example 9 illustrates the improvements in reinforcement properties accompanying partial esterification.

*Example 3*

A 425-pound portion of a sodium silicate solution containing 2.39 grams $SiO_2$ per 100 milliliters of solution and having a molar $SiO_2$:$Na_2O$ ratio of 3.25:1 was charged to a 100-gallon steel tank equipped with a one-half horsepower, 400 R. P. M. "Lightnin" mixer driving a 10" diameter, 3-bladed propellor. The silicate was heated to a temperature of 35±2° C. by steam injection. A sufficient amount (about 162 pounds) of a solution containing 2.40% $H_2SO_4$ was added uniformly over a period of about 30 minutes to bring the pH to 9.7±0.2 as measured at 25° C. During this period, the temperature of the reacting mass was maintained below 40° C. The amount of acid added during this step of the process was equivalent to about 80% of the $Na_2O$ in the original sodium silicate. The sodium ion content remained below 0.3 N throughout the process. The clear sol thus obtained was heated to 95° C. in about 15 minutes. After heating, the sol had a pH of about 10 and contained discrete, ultimate, silica units which were about 5–7 millimicrons in diameter.

Solutions of sodium silicate and sulfuric acid were then added simultaneously at a uniform rate over a period of 2 hours through inlets located close to the vortex formed by the agitator. The 85.4 pounds of the sodium silicate solution used contained 13.22 grams of $SiO_2$ per 100 milliliters of solution and had a molar $SiO_2$:$Na_2O$ ratio of 3.25:1. The sulfuric acid (a 4.65% aqueous solution) was added in an amount to maintain the pH of the reaction mixture at 10.3±0.2 (as measured at 25° C.) throughout the course of the reaction. Such an amount is sufficient to neutralize about 80% of the $Na_2O$ in the silicate solution and maintain the sodium ion concentration below 0.2 normal throughout the process. The temperature was maintained at 95° C. throughout the addition of acid and silicate.

During the heating of the initial sol and the subsequent addition of silicate and acid, the tiny, discrete particles of the sol increased in size and then became chemically bound together in the form of open networks or coherent aggregates of supercolloidal size, wherein the colloidal particles were present as dense ultimate units. The aggregates were precipitated. In the simultaneous addition of silicate and acid, about 1 part of silica was added for each part of silica in the original sol. Thus, the build-up ratio on the aggregates was about 1:1.

Still maintaining a temperature of 95° C., the pH of the solution was adjusted from 10.3 to 5.0 by adding 4.65% sulfuric acid at a rate of about 0.24 gallon per minute for 20 minutes and then adding small portions followed by repeated pH determinations, until the pH was 5 as measured at 25° C. This required about 32 pounds of the sulfuric acid solution.

The slurry thus obtained was then maintained at 85–95° C. without agitation for 4 hours, in order to coagulate the precipitate to aid in filtration. The precipitate was filtered in several portions on a 50-gallon Nutsche filter, using nylon cloth as a filter medium. The filter cake was washed on the filter with 5 displacements of cold water, and then sucked as dry as possible. The final filter cake contained between 6 and 7% solids.

The finely divided, precipitated silica in this water-wet filter cake consisted of reinforced aggregates, as was evidenced by the fact that the coalescence factor of this silica was 45%. Examination of the product with the electron microscope showed that it consisted of coherent supercolloidal aggregates of spherical ultimate units which were about 10 millimicrons in diameter. The product had a uniformity factor of 75% and X-ray diffraction examination demonstrated that the silica was amorphous.

In order to esterify some of the silica present in the "wet cake," a portion of the combined filter cake was slurried with sufficient normal butanol to give a n-butanol-water azeotrope plus sufficient excess butanol to leave a slurry containing 9 to 10% solids after complete water removal. This mix was then charged to a still for azeotropic dehydration. The still consisted of a 75-gallon reboiler, a 20' x 6" diameter column packed with ½" Raschig rings, an overhead condenser, and a decanter which returned the butanol-rich upper layer to the column as reflux and separated the heavier water-rich layer. The slurry was then dehydrated azeotropically until the water content of the slurry was below 0.1% by Fischer water analysis, and actually around 0.05%.

The butanol slurry was then transferred in 20–22 pound batches to a 5-gallon stainless steel, stirred autoclave and heated to 300±5° C. under autogenous pressure. The heatup required 2 to 3 hours, and the temperature was maintained at 300° C. for 15 to 20 minutes and cooled rapidly to below 100° C. over 30 to 45 minutes. The slurry was removed from the autoclave and dried in a vacuum oven at 110° C. and 10 to 20 mm. Hg pressure until the silicia reached constant weight.

The resulting material was a fluffy white powder which was organophilic and hydrophobic. It had a specific surface area of 277 m.$^2$/g. as measured by conventional nitrogen adsorption techniques and showed no adsorption of methyl red dye. Analysis showed that the product contained 6.56% carbon, which corresponded to 274 butyl ester groups per 100 sq. millimicrons of silica surface. The bulk density of this product was 0.13 g./cc. under a compressive load of 3 p. s. i.

When this esterified silica is incorporated into conjugated diene elastomers according to techniques commonly practiced in the rubber industry, vulcanizates are produced which are vastly superior to those prepared from the unesterified modification of this silica, superior to those obtained with conventional inorganic reinforcing pigments, and equal or even superior in many respects to those obtained with highly reinforcing carbon black fillers. The characteristics of natural rubber stocks reinforced with this particular estersil are summarized under Sample B in the table, below, which also includes results obtained on control stocks containing the unesterified forms of the same silica (Sample A), a general purpose silica filler (Sample C) and EPC black (Sample D) in order to demonstrate more clearly the useful and beneficial effects of esterification.

These data were obtained by examination of stocks which were compounded by dry milling according to the techniques commonly practiced in the rubber industry employing the following formulation:

Ingredients: Parts by weight
Smoked sheet _____ 100
Zinc oxide _____ 5
"Neozone A" (phenyl alpha naphthylamine) ___ 1
Filler _____ 60
Stearic acid _____ 1
Accelerators _____ as indicated
Sulfur _____ 3

After 24 hours these blends were cured at 287° F. in a steam heated hydraulic press. After an additional 24 hours rest period at room temperature, their stress-strain properties and tear resistances were determined according to ASTM procedures using a Scott testing machine. Hardness was measured with a Shore durometer, Type A.

The unesterified silica (Sample A) was obtained from a portion of "wet cake" prepared in essentially the same manner as that described above, except that 0.2% by weight (on SiO2 basis) of an equi-molar mixture of cetyl and lauryl trimethylammonium bromide was used as a coagulant in place of the heat aging step previously described. The water was removed from 4000 grams of "wet cake" by repeated slurrying with 4 liters of acetone, filtering, and washing with 1 liter of acetone. This procedure was repeated four times at which point the water content of the filtrate was found to be only 4.5% by Fischer titration. The washed cake was then placed in an infra red oven to remove excess acetone and finally dried in an oven at 120° C. The resulting product was a fluffy, white, hydrophilic powder with a bulk density of 0.12 g./cc. measured under a compressive load of 3 p. s. i., a specific surface area of 335 m.$^2$/g. as determined by nitrogen adsorption, and a specific hydroxylated area of 208 m.$^2$/g. as measured by methyl red adsorption, indicating that the surface was covered essentially by silanol groups. If the wet cake had been dried directly from water by conventional methods, a very coarse, gritty product would have resulted, whereas the product which was employed differed from the estersil (Sample B) essentially in the chemical nature of the surface.

| Sample | Characterization of Silica | | | | Parts Accelerators [2] | Cure Time, min. | Test Results on Rubber Stocks | | | | |
|---|---|---|---|---|---|---|---|---|---|---|---|
| | $D_n$, m$\mu$ | $S_n$, m.$^2$/g. | $S_d$, m.$^2$/g. | D. E. | | | Tensile Strength, p. s. i. | Crescent Tear, lb./in. | Elongation at Break, percent | 300% Modulus, p. s. i. | Hardness (Shore) |
| A | | 335 | 208 | | 4 MBTS + .1 Thiuram M. | 15 | 2,590 | 170 | 520 | 1,390 | 87 |
| | | | | | | 30 | 2,350 | 165 | 490 | 1,390 | 90 |
| | | | | | | 45 | 2,250 | 175 | 500 | 1,275 | 91 |
| B | | 277 | 0 | 274 | 4 MBTS + 0.1 Thiuram M. | 15 | 5,025 | 1,057 | 760 | 990 | 76 |
| | | | | | | 30 | 4,750 | 792 | 700 | 1,130 | 81 |
| | | | | | | 45 | 4,540 | 898 | 700 | 1,030 | 82 |
| C [1] | 24 | 100 | 99 | | do | 15 | 3,150 | 230 | 540 | 1,390 | 63 |
| | | | | | | 30 | 3,900 | 565 | 560 | 2,000 | 73 |
| | | | | | | 45 | 3,820 | 455 | 520 | 2,110 | 73 |
| D (EPC Black) | | | | | 1 "Santocure" | 15 | 4,150 | 620 | 530 | 2,010 | 66 |
| | | | | | | 30 | 3,975 | 382 | 480 | 2,375 | 72 |
| | | | | | | 45 | 3,710 | 438 | 440 | 2,425 | 75 |

[1] See Example 8 for further characterization.
[2] MBTS is benzothiazyl disulfide. Thiuram M is tetramethyl thiuram disulfide. "Santocure" is benzothiazyl-2 monocyclohexyl sulfenamide.

*Example 4*

The silica substrate used to prepare the particular estersil utilized in this example was prepared by essentially the same method as that described in Example 3.

The water was removed from the wet cake by azeotropic distillation with n-butanol as described in Example 3; however, the esterification step was accomplished in a much shorter time.

The resulting estersil was a white, fluffy powder which was organophilic and hydrophobic. It had a specific surface area of 294 m.$^2$/g. as measured by nitrogen adsorption techniques, and a specific hydroxylated area of 35–45 m.$^2$/g. as determined by methyl red adsorption. Analysis showed that this product contained 6.86% carbon, which corresponds to 271 butoxy groups per 100 sq. millimicrons of silica surface. The bulk density of this particular estersil was 0.10 g./cc. under a compressive load of 3 p. s. i.

When this estersil was incorporated into Neoprene GN and Neoprene Type W according to dry milling techniques commonly employed in the trade, vulcanizates with extraordinarily high tensile strengths and tear resistances were obtained. The beneficial and extremely useful results achieved with this estersil in neoprene are illustrated under Sample A of the table below, which also includes for comparative purposes the physical properties of similar vulcanizates containing equal loadings of a commercial siliceous filler (Sample B). These data were obtained by examination of stocks which were compounded by dry milling according to the techniques commonly practiced in the rubber industry, employing the following formulation:

Ingredients: Parts by weight
Polymer as indicated _____ 100
Stearic acid _____ 0.5
"Neozone A" (phenyl alpha naphthylamine) __ 2.0
Magnesia _____ 4.0
Silica as indicated _____ 40 or 60 (as indicated)
Zinc oxide _____ 5.0

After 24 hours these blends were cured at 287° F. in a steam-heated hydraulic press. After an additional 24 hours relaxation period at room temperature, their stress-strain, tear resistance and hardness properties were determined according to ASTM procedures using a Scott testing machine and a Shore durometer, Type A.

| Sample | Characterization of Silica | | | | Polymer Employed and Formulation Details | Cure Time in Minutes | Test Results on Final Vulcanates | | | | |
|---|---|---|---|---|---|---|---|---|---|---|---|
| | $D_n$, m$\mu$ | $S_n$, m.²/g. | $S_d$, m.²/g. | D. E. | | | Tensile Strength, p. s. i. | Crescent Tear, lbs./in. | Elongation at Break, percent | 300% Modulus, p. s. i. | Shore Hardness |
| A | | 294 | 35-45 | 271 | Neoprene GN [2] at 40 weight silica. | 30<br>45<br>60 | 4,600<br>4,825<br>5,125 | 625<br>601<br>735 | 940<br>900<br>920 | 1,050<br>1,130<br>1,180 | 86<br>86<br>87 |
| | | | | | Neoprene GN at 60 weight silica. | 30<br>45<br>60 | 3,830<br>4,100<br>4,190 | 833<br>841<br>800 | 840<br>850<br>840 | 1,400<br>1,480<br>1,475 | 96<br>98<br>98 |
| B [1] | 24 | 100 | 99 | | Neoprene GN at 40 weight silica. | 30<br>45<br>60 | 2,750<br>2,950<br>2,800 | 496<br>398<br>408 | 800<br>780<br>740 | 1,120<br>1,230<br>1,220 | 80<br>80<br>81 |
| | | | | | Neoprene GN at 60 weight silica. | 30<br>45<br>60 | 2,490<br>2,510<br>2,575 | 620<br>615<br>595 | 600<br>620<br>620 | 1,850<br>1,820<br>1,825 | 92<br>92<br>96 |
| A | | 294 | 35-45 | 271 | Neoprene Type W [3] at 20 weight silica +1.0 part NA-22 [4] | 30<br>60<br>90 | 4,420<br>4,420<br>4,325 | 383<br>318<br>330 | 780<br>700<br>690 | 860<br>930<br>930 | 71<br>71<br>71 |
| | | | | | Neoprene Type W at 40 weight silica +1.0 part NA-22. | 30<br>60<br>90 | 5,125<br>5,200<br>5,400 | 870<br>725<br>668 | 860<br>780<br>740 | 1,380<br>1,525<br>1,650 | 87<br>88<br>88 |
| | | | | | Neoprene Type W at 60 weight silica +1.0 part NA-22. | 30<br>60<br>90 | 4,860<br>5,050<br>5,210 | 1,013<br>996<br>1,011 | 810<br>760<br>730 | 1,950<br>2,000<br>2,250 | 96<br>98<br>98 |

[1] See Example 8 for further characterization.
[2] Neoprene GN is a polymerized chloroprene. According to (1) Compounding Ingredients for Rubber, 2nd. ed., 1947, India Rubber World, N. Y., N. Y., pp. 539, 547; (2) "Structure-Property Relationships for Neoprene Type W," W. E. Mochel, J. B. Nichols, Ind. and Eng. Chem., vol. 43, 154, et seq. (January 1951), Neoprene GN contains approximately 2-2.5% chemicals of the thiuram type, 50% of the polymer having a molecular weight greater than 165,000 and the most abundant species having a molecular weight of 100,000.
[3] Neoprene Type W is a polychloroprene elastomer. (According to reference (2) above, it has a higher, more uniform molecular weight than Neoprene GN, and is a more linear polymer. 50% of the polymer has a molecular weight greater than 280,000, and the most abundant species has a molecular weight of 180,000.)
[4] NA-22 is 2-mercaptoimidazoline.

*Example 5*

In this example, Sample A was a silica aerogel substrate and Sample B was an esterified product made therefrom, as follows: Five hundred grams of a silica aerogel ("Santocel C") were dried at 120° C. and slurried in 1 gallon of n-butanol. The slurry was heated in a 3-gallon stainless steel autoclave to 225° C. and was then cooled to room temperature. The resulting slurry was filtered, dried on a steam plate, reduced to a very fine powder by Raymond milling, and finally dried in an oven at 120° C. The resulting powder was organophilic and contained 1.71% carbon as determined by chemical analysis. Since the specific surface area of the unesterified silica was 157 m.²/g., the esterification amounted to about 140 butoxy groups per 100 square millimicrons of surface area. The specific hydroxylated surface area as determined by dye adsorption was 25 m.²/g., a 78% reduction from that of the unesterified silica (114 m.²/g.).

*Elastomer reinforcement.*—The siliceous substrate (Sample A) and its esterified modification (Sample B) described above were milled into natural rubber, cured at 287° F. and tested according to the usual practices of the rubber industry described in previous examples, employing the following formulation:

| Ingredients: | Parts by weight |
|---|---|
| Smoked sheet | 100 |
| Stearic acid | 1 |
| "Neozone A" (phenyl alpha naphthylamine) | 1 |
| Sulfur | 3 |
| Zinc oxide | 5 |
| Silica fillers | 60 |
| Accelerators | as indicated |

The data presented in the table below demonstrate the beneficial results realized on the reinforcement properties of this particular silica substrate when it was esterified. The most outstanding improvements noted upon esterification were in the tensile strengths and tear resistances imparted to the reinforced vulcanizates by this esterified filler.

*Example 6*

Chrysotile asbestos is regarded in the art to possess little or no value as a reinforcing agent for rubber. I have found, however, that after applying a surface ester coating to this siliceous substrate, its reinforcement characteristics are greatly enhanced.

The estersil employed in this example was the product of Example 9 of U. S. Patent 2,657,149.

*Elastomer reinforcement.*—The esterified asbestos described above was milled into natural rubber, cured at 287° F. and tested according to the previously described practices of the rubber industry, employing the following formulation:

| Ingredients: | Parts by weight |
|---|---|
| Smoked sheet | 100 |
| Stearic acid | 1 |
| Sulfur | 3 |
| Zinc oxide | 5 |
| Esterified asbestos | 60 |
| Accelerators | as indicated |

| Sample | Characterization of Silica | | | Accelerator System Employed | Cure Time at 287° F., min. | Test Results on Final Vulcanizates | | | | |
|---|---|---|---|---|---|---|---|---|---|---|
| | $S_n$, m.²/g. | $S_d$, m.²/g. | D. E. | | | Tensile Strength, p. s. i. | Crescent Tear, lb./in. | Elongation at Break, percent | 300% Modulus, p. s. i. | Hardness |
| A | 157 | 114 | | 2 MBTS+0.1 Thiuram M | 15<br>30<br>45 | 2,525<br>2,520<br>2,390 | 147<br>128<br>155 | 640<br>580<br>540 | 890<br>1,000<br>1,040 | 82<br>84<br>86 |
| | | | | 4 MBTS+0.1 Thiuram M | 15<br>30<br>45 | 2,740<br>3,100<br>2,925 | 135<br>153<br>153 | 600<br>580<br>560 | 940<br>1,190<br>1,260 | 81<br>86<br>90 |
| B | 157 | 25 | 140 | 2 MBTS+0.1 Thiuram M | 15<br>30<br>45 | 3,575<br>3,840<br>3,720 | 200<br>543<br>473 | 700<br>660<br>660 | 770<br>1,060<br>950 | 66<br>72<br>74 |
| | | | | 4 MBTS+0.1 Thiuram M | 15<br>30<br>45 | 4,040<br>4,525<br>4,470 | 580<br>783<br>835 | 700<br>620<br>620 | 950<br>1,520<br>1,525 | 68<br>80<br>80 |

The data summarized in the table below clearly demonstrate that the esterified asbestos has produced reinforced stocks.

| Characterization of Esterified Asbestos | | Accelerator System | Cure Time at 287° F., min. | Test Results on Vulcanizates | | | | |
|---|---|---|---|---|---|---|---|---|
| $S_n$ | $S_d$ | | | Tensile Strength, p. s. i. | Crescent Tear, lb./in. | Elongation at Break, percent | 300% Modulus, p. s. i. | Hardness (Shore) |
| 125 m.²/g. | 0 | 4 MBTS 0.1 Thiuram-M | 30 45 | 3,400 3,410 | 193 425 | 360 330 | 3,050 3,200 | 75 77 |
| | | 6 MBTS 0.1 Thiuram-M | 30 45 | 3,300 3,270 | 490 322 | 360 300 | 2,795 3,250 | 77 80 |

Example 7

The beneficial results of esterification on the general reinforcing properties of siliceous substrates was further illustrated using attapulgite clay as the substrate.

*The siliceous substrate of sample A.*—Attapulgite clay ("Attasol" Grade, Attapulgus Clay Co.) was suspended in distilled water in the ratio of 120 g. of clay to 1500 ml. H₂O. The suspension was placed in a 1-gallon ball mill and the following quantities of porcelain balls added:

Size: Grams added
1½" diameter _____ 1600
1" diameter _____ 1150
¾" diameter _____ 360
½" diameter _____ 90

The mixture was milled for approximately 24 hours and combined with three other similar batches. After sufficient washing in order to separate the balls, the total volume of water present was 7680 ml. and the weight of attapulgite was 480 gms. The entire slurry was placed in a round bottom flask fitted with a reflux condenser and mercury sealed stirrer. Sufficient concentrated (95.5%) sulfuric acid was added to make the slurry 17% with respect to the acid (1680 g.) bringing the total weight to 9840 g. The mixture was then heated to reflux temperature and maintained for 6 hours. The cooled mixture was filtered and reslurried in 8 liters of water, filtered, reslurried again with 12 liters of water and filtered.

*The siliceous substrate of sample B.*—The siliceous substrate of Sample B was prepared in the same manner as that of Sample A, except that: (1) the acid strength of the milled "Attasol" suspension was adjusted to only 2% by the addition of concentrated sulfuric acid; (2) the refluxing temperature was maintained for only 2 hours during the acid treatment; and (3) only one reslurry using 8 liters of water was employed in washing the filtered product.

*Dehydration and esterification.*—Approximately 1200 g. portions of each of the wet siliceous substrates A and B were treated with 6 liters of n-butanol in a 12-liter three-necked flask fitted with a distillation column, a head suitable for separating butanol-water overhead mixtures and returning the butanol to the column, and a suitable device for determining the reflux temperature of the mixture. The charge was brought to distillation temperature and maintained until all the water was removed as the n-butanol-water azeotrope which was achieved when the reflux temperature reached the boiling point of n-butanol.

One and one-half gallons of these dehydrated butanol slurries were then charged to a 3-gallon autoclave and the autoclave temperature raised to 225–240° C. for 30 minutes under autogenous pressure. After cooling, the autoclave charge was filtered and dried in a 75° C. vacuum oven.

*Esterified products.*—The resulting products were organophilic, fluffy powders characterized by the physical and chemical properties shown in the table below. It is particularly significant to note that the estersil prepared from the substrate which was treated with the more concentrated acid (Sample A) retained a much lower proportion of its entire specific surface as hydroxylated area (capable of adsorbing methyl red), presumably because the stronger acid treatment created a larger proportion of silanol groups per unit surface area which silanol groups were subsequently esterified during the n-butanol treatment.

*Elastomer reinforcement.*—The two partially esterified attapulgite clays described above were incorporated into natural rubber, cured at 287° F. and the vulcanizates tested according to the accepted techniques discussed previously, employing the following formulation:

Ingredients: Parts by weight
Smoked sheet _____ 100.0
Stearic acid _____ 1.0
Sulfur _____ 3.0
Zinc oxide _____ 5.0
Esterified attapulgite _____ 60.0
Accelerators _____ as indicated The properties of the reinforced vulcanizates summarized in the table below further illustrate the benefits realized as the degree of esterification of siliceous substrates is increased. The most striking advantages realized by esterifying attapulgite clay were in the important properties of tear resistance and tensile strength.

| Example | Characterization of Esterified Attapulgite | | | | Accelerator System | Cure Time at 287° F., min. | Test Results on Vulcanizates | | | | |
|---|---|---|---|---|---|---|---|---|---|---|---|
| | $S_n$, m.²/g. | $S_d$, m.²/g. | Per cent C | D. E. | | | Tensile Strength, p. s. i. | Crescent Tear, lb./in. | Elongation at Break, percent | 300% Modulus, p. s. i. | Hardness (Shore) |
| B | 180 | 134 | 3.26 | 265 | 4 MBTS 0.1 Thiuram M | 30 45 | 2,300 2,225 | 238 230 | 240 260 | | 79 79 |
| | | | | | 6 MBTS 0.1 Thiuram M | 30 45 | 2,500 2,410 | 232 227 | 260 230 | | 80 82 |
| A | 157 | 67 | 4.32 | 403 | 4 MBTS 0.1 Thiuram M | 30 45 | 3,810 3,910 | 760 390 | 410 430 | 2,875 2,825 | 70 73 |
| | | | | | 6 MBTS 0.1 Thiuram M | 30 45 | 3,950 3,660 | 560 540 | 440 400 | 2,825 2,840 | 71 79 |

Example 8

The following example illustrates that stocks reinforced with estersils require less accelerator in order to produce full cures than those containing corresponding, unesterified silicas.

The silica substrate employed was a siliceous powder which was dried to constant weight at 120° C. This material was essentially silica but contained from 1.5 to 2.5% by weight of combined calcium. The specific surface area was 140 m.²/g. and the specific hydroxylated surface area was 144 m.²/g. as determined by dye adsorption. The bulk density was 0.10 g./cc. at 3 p. s. i.; 0.23 g./cc. at 57 p. s. i.; and 0.64 at 1560 p. s. i. above atmospheric.

To produce the estersil, a 500-gram portion of the dry substrate was slurried in a gallon of n-butanol and the mixture was heated to 250° C. in a 3-gallon stainless steel autoclave under autogenous pressure. The mixture was then cooled to room temperature, filtered and the filter cake was partially dried on a steam plate, and finally in a 120° C. oven.

The resulting light, fluffy powder was organophilic and hydrophobic. It exhibited no adsorption of methyl red dye from benzene solution, thus no specific hydroxylated area was detectible on the surface of this particular estersil. Chemical analysis showed that this product contained 2.80% carbon which corresponds to 293 butoxy groups per 100 square millimicrons of surface.

The unesterified siliceous substrate and the estersil made therefrom were compounded into natural rubber according to the formula and procedure described in Example 2, the proportion of sulfur being 3 parts by weight. The physical properties of the resulting stocks, as summarized in the following table, show that the application of an ester coating to a siliceous filler significantly reduces the quantity of accelerator required for full cure.

The "heel" solution prepared as described above was somewhat turbid; however, there was no visual sign of precipitation. Immediately after the addition of the acid, the "heel" was heated to a temperature of 95° C. during a period of approximately 10 minutes. When the solution reached a temperature of 95° C., 48 liters of sodium silicate feed solution (12,600 grams of "F–Grade" diluted to 48 liters) were fed into the reaction vessel through a $\frac{3}{32}$" I. D. pipe which was directed horizontally into the blade of the stirrer and 48 liters of sulfuric acid solution (1,450 grams of C. P. $H_2SO_4$ diluted to 48 liters) were introduced into the pump simultaneously at uniform rates of 24 liters per hour. Uniformity of feed and steady feed rate were maintained by means of a heavy-duty proportioning pump. The temperature during build-up was maintained between 95° C. and 97° C.

The product of this "build-up" step was a slurry containing precipitated silica, the pH being about 10.5. The pH of this slurry was reduced to about 8.5 by adding 5 liters of a dilute sulfuric acid solution containing 400 g. of C. P. $H_2SO_4$ at a uniform rate over a period of 30 minutes. The resulting hot slurry was dumped into a 55-gallon drum, coagulated by treatment with 0.2% by weight (based on $SiO_2$) of a mixture of equimolar portions of cetyl and lauryl trimethyl ammonium bromide, and filtered on a filter press, under a pressure of about 40 p. s. i. The filter cake was reslurried in about 80 liters of water, the pH of this slurry was adjusted to 5

| Sample | Characterization of Fillers | | | | Accelerator System | Cure Time at 287° F., min. | Test Results on Vulcanizates | | | | |
|---|---|---|---|---|---|---|---|---|---|---|---|
| | $S_n$, m.²/g. | $S_d$, m.²/g. | Percent C | D. E. | | | Tensile Strength, p. s. i. | Crescent Tear, lb./in. | Elongation at Break, percent | 300% Modulus, p. s. i. | Hardness (Shore) |
| Substrate | 140 | 144 | | | 2 MBTS | 15 | 2,975 | 303 | 640 | 860 | 70 |
| | | | | | 0.1 Th. M | 30 | 2,840 | 102 | 600 | 875 | 73 |
| | | | | | 4 MBTS | 15 | 4,270 | 570 | 660 | 1,160 | 70 |
| | | | | | 0.1 Th. M | 30 | 3,890 | 332 | 640 | 1,140 | 74 |
| Substrate, esterified. | 140 | | 2.80 | 293 | 2 MBTS | 15 | 4,375 | 773 | 760 | 590 | 58 |
| | | | | | 0.1 Th. M | 30 | 3,710 | 825 | 730 | 530 | 62 |
| | | | | | 4 MBTS | 15 | 4,210 | 845 | 710 | 725 | 65 |
| | | | | | 0.1 Th. M | 30 | 3,910 | 662 | 640 | 860 | 73 |

*Example 9*

The following example illustrates the beneficial results achieved even when the degree of esterification of the estersil is somewhat lower than in the previous examples.

*Sample A.*—The siliceous substrate was prepared in a 55-gallon drum. During the reaction described below, the solution was pumped through a pipe attached to the bottom of the drum to a centrifugal pump, and from the pump through a jacketed pipe and back into the top of the drum reactor. The jacketed pipe was used as a heat exchanger, the heat being supplied in the form of high pressure steam. The drum was equipped with a high speed (1725 R. P. M.) stirrer which was placed slightly off center, a thermometer and an automatic temperature recorder. An additional thermometer was placed in the pipe line just after the heat exchanger section.

A 4% silicate solution was introduced into the reactor by diluting 6,300 grams of commercial "F–Grade" sodium silicate (having an $SiO_2:Na_2O$ mol ratio of 3.36, and containing 28.4% $SiO_2$) to a total volume of 45 liters. The charge was heated to 83° C. and 15 liters of dilute sulfuric acid solution (75 grams of C. P. $H_2SO_4$ [95.5%] to 15 liters) was then added through the centrifugal pump, at a uniform rate over a period of 30 minutes, thus reducing the pH to about 10. It is important that, at the point of addition of acid, the agitation be sufficient to completely and instantaneously mix the incoming acid with the solution in the reactor. The temperature was maintained between the limits of 83° C.±1° C. during the "heel" formation. The steam pressure in the heating jacket was maintained at such a level that the solution from the heat exchanger entering the reaction drum was about 1.5° C. higher than the temperature in the body of the reaction vessel.

by the addition of dilute sulfuric acid, and the reslurry was then filtered as above. The wet filter cake was dried at 110° C. and ground with a Raymond mill, through a screen of 200 mesh.

The resulting siliceous substrate was a white powder consisting of coherent aggregates of coalesced ultimate dense units having an average unit diameter of from 15 millimicrons to 19 millimicrons as calculated from nitrogen adsorption measurements. The product exhibited a specific hydroxylated surface area of 160 m.²/g. as measured by methyl red adsorption from benzine solution.

A dry, ground siliceous substrate prepared as described above was heated to 500° C. in an anhydrous atmosphere. In this heating step the silica, in a porcelain pan approximately 6" long, 3" deep, and 4" wide, was placed in an oven previously heated to 500° C., and maintained under these conditions for 1 hour. The dehydrated silica was removed and placed in a desiccator over calcium chloride. This heat-activated silica is described and claimed in copending U. S. patent application Ser. No. 261,139, filed December 11, 1951, by Warren K. Lowen.

Following dehydration, the activated silica was placed in a wide mouth bottle and 5% normal butanol, based on the weight of the silica, was added in the form of a liquid. The bottle was tightly stoppered and the whole mixture was shaken. The stoppered bottle was heated in an oven at a temperature of 100–110° C. for a period of about 2 hours. After cooling, the excess butanol was removed from the estersil by transferring the batch to open pans in an oven (anhydrous atmosphere) at a temperature of 130° C. The silica was left in this oven for a period of about one hour.

The resulting organophilic powder had the following chemical analysis: $SiO_2=91.9\%$, $C=2.21\%$. The specific surface area of this product was 138 m.$^2$/g. as determined by nitrogen adsorption and its specific hydroxylated area was 19 m.$^2$/g. as measured by methyl red adsorption. The bulk density of this estersil was 0.18 g./cc. under a compressive load of 3 p. s. i. This heat-activated, esterified silica is described and claimed in copending U. S. patent application Ser. No. 261,140, filed December 11, 1951, by Max T. Goebel.

*Sample B.*—The siliceous substrate used for Sample B was similar to that employed in the preparation of Sample A. The esterification was carried out in the same manner as that described above except that isopropyl alcohol was substituted for n-butanol.

The resulting organophilic estersil had a specific hydroxylated area of 45 m.$^2$/g. as measured by methyl red adsorption.

*Sample C.*—The estersil of Sample C was prepared in the manner as that described for Samples A and B except that isoamyl alcohol was used as the esterifying agent. The resulting organophilic powder exhibited a specific hydroxylated area of 34 m.$^2$/g., as determined by methyl red dye adsorption from benzene solution.

*Elastomer modification.*—Each of the three aforementioned estersils and the unesterified modification were compounded into natural rubber, using the compounding formula and procedure of Example 8, except that the "Neozone A" antioxidant was omitted. The physical properties of the resulting stocks tabulated in the table below illustrate the beneficial effects of using partially esterified silicas as rubber reinforcing agents in preference to their unesterified modifications.

range. In addition, when other variables are held constant, increases in the degree of esterification of a particular silica substrate result in softer, lower modulus stocks with increases in elongation at break also paralleling such increases in esterification. As long as the degree of esterification is sufficient to permit the maximum dispersion of the filler aggregates, the tensile strength and tear resistance of estersil reinforced vulcanizates are relatively independent of this variable. However, 5–10 m$\mu$ silicas must be highly esterified before they may be completely dispersed and produce optimum stocks from the standpoint of tensile and tear.

In general, the tensile strength, tear resistance, and hardness of cured stocks vary directly with the specific surface areas of the estersil filler, apparently approaching a maximum in the range of 350–400 m.$^2$/g., whereas the modulus of elongation and the elongation at break of such vulcanizates are relatively independent of specific surface area.

The shape factor, in general, does not influence tensile and tear results to a large extent; however, as the length to breadth ratio of the ultimate estersil filler particles increases, stocks with higher modulus and lower elongations at break are obtained.

To give satisfactory results, a filler must be dispersible in the elastomer mix. Dense silica gel particles with extremely small pores are not readily dispersed by conventional milling practices of the rubber industry even when their exposed surfaces are esterified. Consequently, the most satisfactory estersil fillers are made from silica substrates with relatively large pores, rather than from conventional dense silica gels having average pore diameters in the range of 2–3 m$\mu$.

| Sample | Esterifying Alcohol | Characteristics of Filler, $S_d$, m.$^2$/g. | Accelerator System | Test Results on Vulcanizates | | | | | |
|---|---|---|---|---|---|---|---|---|---|
| | | | | Cure Time, min. | Tensile Strength, p. s. i. | Crescent Tear, lb./in. | Elongation at Break, percent | Modulus, p. s. i. | Hardness (Shore) |
| Substrate A | | 160 | 2 MBTS / 0.1 Th. M | 15 / 30 / 45 | 2,170 / 2,040 / 1,950 | 108 / 133 / 138 | 450 / 420 / 410 | 1,320 / 1,375 / 1,340 | 81 / 85 / 87 |
| | | | 4 MBTS / 0.1 Th. M | 15 / 30 / 45 | 2,690 / 2,670 / 2,520 | 132 / 198 / 157 | 460 / 410 / 380 | 1,700 / 1,840 / 1,860 | 81 / 84 / 86 |
| A, esterified | n-Butanol | 19 | 3 MBTS / 0.1 Th. M | 12 / 15 / 30 | 4,175 / 4,025 / 3,830 | 655 / 805 / 725 | 560 / 520 / 500 | 2,175 / 2,170 / 2,150 | 73 / 77 / 78 |
| B, esterified | iso-propanol | 45 | 4 MBTS / 0.1 Th. M | 15 / 30 / 45 | 3,600 / 3,900 / 3,750 | 692 / 532 / 568 | 580 / 540 / 520 | 1,480 / 1,925 / 1,820 | 74 / 76 / 78 |
| C, esterified | iso-amyl alcohol | 34 | 4 MBTS / 0.1 Th. M | 15 / 30 / 45 | 4,090 / 3,800 / 3,675 | 800 / 725 / 665 | 540 / 520 / 520 | 2,190 / 2,050 / 1,990 | 78 / 78 / 78 |

From the preceding examples it is apparent that esterification of a variety of siliceous substrates improves their elastomer reinforcement powers. The physical properties of the final vulcanizate, however, vary widely with the choice of siliceous substrate, as well as with the degree of surface esterification. The significant variables which influence the extent of reinforcement are the degree of surface esterification, the specific surface area of the substrate, the shape of the substrate particles, and in the case of aggregates, the openness of packing of the ultimate units in the aggregates as measured, for example, by pore diameter determinations.

For a particular silica substrate, ease of dispersion of the filler in the elastomer mix is directly dependent upon increases in the degree of esterification for silicas with average ultimate particle diameters smaller than about 17–18 m$\mu$, and particularly in the 5–10 m$\mu$ diameter The following examples illustrate more specifically the effects of these variables.

*Example 10*

To illustrate the effects of increases in the degrees of esterification, a particular silica substrate was treated with n-butanol in various ways to produce estersils in which the number of —OR groups per unit surface area varied widely.

*Silica substrate.*—The silica substrate of these experiments was prepared as described in Samples A and B of Example 3.

*Sample A.*—Twenty-six pounds of siliceous substrate "wet-cake" were placed in a glass lined kettle, and the water displaced by the addition of n-butanol followed by azeotropic distillation. The n-butanol layer separated from the distillate was returned to the still pot, and the distillation continued until a reflux temperature of 116° C. was reached. The charge was cooled, filtered, dried under infra red radiation and finally in a 120° C. oven.

an elastomer mix, in order to expose the maximum surface for optimum tensile and tear strength reinforcement.

| Sample | Accelerator System | Cure Time at 287° F., min. | Test Results on Vulcanizates ||||| 
|---|---|---|---|---|---|---|---|
| | | | Tensile Strength, p. s. i. | Crescent Tear, lb./in. | Elongation at Break, percent | 300% Modulus, p. s. i. | Hardness (Shore) |
| A | 4 MBTS / 0.1 Th. M | 15 / 30 / 45 | 4,730 / 4,425 / 4,225 | 1,087 / 1,020 / 977 | 680 / 660 / 680 | 1,360 / 1,310 / 1,225 | 87 / 88 / 90 |
| B | 4 MBTS / 0.1 Th. M | 15 / 30 / 45 | 5,025 / 4,750 / 4,540 | 1,057 / 792 / 898 | 760 / 700 / 700 | 990 / 1,130 / 1,030 | 76 / 81 / 82 |
| C | 4 MBTS / 0.1 Th. M | 15 / 30 / 45 | 4,850 / 4,700 / 3,925 | 1,030 / 1,010 / 930 | 780 / 740 / 680 | 775 / 900 / 840 | 70 / 73 / 76 |

After Raymond milling, the resulting product was a fluffy, white, oragnophilic powder with a bulk density of 0.12 g./cc. measured under a pressure of 3 p. s. i. above atmospheric, a specific hydroxylated area of 44 m.$^2$/g. as determined by methyl red adsorption, and a specific surface area of about 211 m.$^2$/g. as determined by nitrogen adsorption.

*Sample B.*—The estersil of Sample B was identical with the estersil described in Sample B of Example 3. Even though this product was hydrophobic and had no specific hydroxylated area as determined by methyl red adsorption, rupture of the junction points of the ultimate silica units when it is milled into an elastomer creates unesterified areas which are then exposed to the rubber mix.

*Sample C.*—More complete esterification of the ultimate units was achieved by premilling the dry estersil of Sample B, thus rupturing many of these junction points, and reesterifying the unesterified areas thus created.

Equal parts of the estersil of Sample B and beads were charged to a bead-mill jar (filling jar ⅔ full), and the mixture dry bead-milled for approximately 48 hours. The resulting unesterified area which was created by rupture of the junction points of the reinforced estersil was resterified by slurrying with an excess of n-butanol in a 3-gallon autoclave and heating to 240° C. under autogenous pressure. The autoclave charge was cooled, the excess n-butanol removed by evaporation, the estersil dried on a steam plate, and finally in a 120° C. oven.

These three estersils were incorporated into natural rubber stocks, the stocks cured, and the final vulcanizates tested according to the techniques described in Example 2, using the formulation of that example.

The test data summarized in the table below show that increases in the completeness of ester coating on the ultimate silica particles dispersed in an elastomer mix have little effect on the tensile strength and tear resistance of the resulting stocks. However, such increases in ester coverage of the dispersed ultimates result in softer, lower modulus stocks with higher elongations at break.

Comparison of the properties of these three stocks with those of a stock containing an equal loading of the unesterified substrate (Sample A of Example 3) shows that a large increase in tensile strength and tear resistance occurs when the silica filler is esterified. This illustrates the principle that silica fillers of extremely small particle size (5–10 m$\mu$ in diameter) must be rendered at least organphilic before they can be completely dispersed in

*Example 11*

Filler particle shape has a definite effect on the physical properties of estersil-reinforced elastomer vulcanizates. In general, the tensil strength and tear resistance depend on the specific surface area of the dispersed ultimate estersil particles; consequently, particle shape as such does not alter these two physical properties of reinforced elastomers. I have found, however, that at equal filler loadings, stocks filled with particles of estersils which have length to breadth ratios greater than unity possess significantly higher moduli of elongation and lower elongations at break. Using estersils of appropriate surface areas and different shape factors one can prepare mixed elastomer fillers with nearly any desired combination of reinforcement characteristics by a proper adjustment of the ratio of each type in the said mixture.

The benefits achieved by mixing such estersil fillers was illustrated by preparing esterfied rods and spheres as described below:

*Spheres: Sample A.*—The spherical estersil filler particles were prepared essentially as described in Sample C of Example 10, except that the weight ratio of beads to silica employed during milling was 5:1 and the re-esterification was carried out by autoclaving with n-butanol at 300° C. for 15 minutes. The resulting hydrophobic estersil had a specific surface area of 241 m.$^2$/g. as determined by nitrogen adsorption, a carbon content of 9.18% as determined by chemical analysis and no specific hydroxylated area as measured by methyl red adsorption. The degree of esterification as calculated from the carbon content of the estersil was 455 butoxy groups per 100 square millimicrons of substrate area.

*Rods: Sample B.*—The esterfied, rod-like siliceous filler particles were prepared essentially as described in Example 7. The resulting hydrophobic, rod-like estersil was shown by electron micrographs to have an average shape factor of at least 15 to 1, a specific surface area of 191 m.$^2$/g. as detected by methyl red adsorption, and a carbon content of 7.46% as determined by chemical analysis. The degree of esterification corresponded to approximately 456 butoxy groups per 100 square millimicrons of siliceous substrate area.

*Reinforcement characteristics.*—A natural rubber stock containing sixty parts by weight of an equal-weight mixture of these two estersils and two control stocks containing 60 parts by weight of the individual estersils, were milled, cured and tested according to the techniques described in Example 2. The formulation employed, which was the same in all three examples, is included along with the test results of the final vulcanizates in the table below.

| Formulations | Sample (A) | Sample (B) | Sample (A + B) |
|---|---|---|---|
| Smoked Sheet........pts.. | 100 | 100 | 100 |
| Stearic Acid.............. | 1 | 1 | 1 |
| Sulfur..................... | 3 | 3 | 3 |
| Zinc Oxide................ | 5 | 5 | 5 |
| MBTS..................... | 4.0 | 4.0 | 4.0 |
| Thiuram M................ | 0.1 | 0.1 | 0.1 |
| Estersil spheres.......... | 60 | | 30 |
| Estersil rods............. | | 60 | 30 |
| Properties of vulcanizates cured 30 min. at 287° F.: | | | |
| Tensile strength....p. s. i.. | 4,200 | 3,525 | 4,075 |
| Crescent Tear.......lb./in.. | 860 | 490 | 560 |
| Percent Elongation at Break.. | 640 | 300 | 480 |
| 300% Modulus......p. s. i.. | 1,100 | 3,525 | 2,475 |
| Hardness (Shore)........... | 78 | 82 | 77 |

Inspection of these data shows that vulcanizate properties may be controlled at will by mixing the correct proportions of the appropriate spherical and rod-like estersils.

The linearity of filler particles may be achieved by joining several silica spheres into a chainlike group and strengthening the aggregates by cementing the spheres together with "active silica" as disclosed in copending U. S. patent application Ser. No. 244,722, filed August 31, 1951, by G. B. Alexander, F. J. Wolter, and myself. When this particular siliceous substrate is esterified, the resulting estersils produce stocks with higher modulus and hardness than spherical estersils in much the same manner as the linear clay and asbestos particles disclosed above.

Mixtures of halloysite and other rod-like clays with silica particles approximately 10 millimicrons in diameter are good fillers for elastomers such as rubber, and the properties imparted to elastomers by such mixtures can be enhanced by esterifying the clay or silica or both, before milling the mixture into the elastomers.

The use of a variety of esterified siliceous materials as reinforcing fillers in rubber compositions has been illustrated in the foregoing examples. From this limited number of illustrations it becomes apparent that it is possible to select a particular esterified siliceous material to accomplish a particular reinforcement job. The selection is based upon such properties as the specific surface area of the esterified material, the average pore diameter, the particle shape or linearity, the degree of esterification, and the particular formulation limits, such as the filler loading and the accelerator levels.

To obtain the beneficial results of this invention, it is necessary that the siliceous substrates be esterified to such an extent that they are organophilic. Lower degrees of esterification than this do not significantly alter the dispersibility or the accelerator adsorption of the siliceous fillers. In general, these organophilic materials will have a degree of esterification equivalent to 100 —OR groups per 100 millimicrons of surface area. Greater reduction in accelerator adsorption and dispersibility is realized with all silicas or siliceous materials by increasing the degree of esterification to make the materials hydrophobic. This increase in esterification also results in softer stocks, with lower moduli of elongation. It is particularly advantageous to render hydrophobic those siliceous materials which have an extremely small particle size and a correspondingly high specific surface area, that is, in the range upwards of about 200 sq. meters per gram, because these substrates are particularly difficult to disperse and are highly adsorptive toward rubber accelerators. Hydrophobic siliceous materials will generally possess a degree of esterification equivalent to about 200 —OR groups per 100 square millimicrons of surface area. For those siliceous materials having a specific surface area greater than 200 sq. meters per gram, it is beneficial to increase the degree of esterification even above that corresponding to the hydrophobic level in order that the product will retain no specific hydroxylated surface area, i. e., will adsorb no methyl red dye from benzene solution. This degree of esterification corresponds to more than 270 —OR groups per 100 square millimicrons of surface area.

Siliceous materials having a surface area less than 25 sq. meters/gram are usually not very effective as reinforcing fillers for elastomers, whether esterified or not. Estersils of such materials may contribute other valuable properties, however, as when the siliceous materials are fibrous. Conversely, when the purpose is to reinforce an elastomer according to the present invention, it is preferred to use esterified siliceous fillers having a specific surface area greater than 25 sq. meters/gram. In esterifying siliceous materials having a surface area greater than about 400 to 450 sq. meters/gram, difficulty is encountered in preparing the substrates in a form which subsequently can be dispersed mechanically on an elastomer mill. This becomes apparent because the properties of tensile strength and tear strength which depend upon specific surface area tend to level off in this specific surface range. It is preferred that the specific surface area be greater than 60 sq. meters/gram in order to obtain a vulcanizate with relatively high tensile and tear strengths; e. g., 3000 pounds per inch and 450 pounds per inch, respectively, in natural rubber containing 30 volume loadings of the estersil. It is particularly preferred that the specific surface area of the esterified siliceous fillers be greater than about 170 sq. meters/gram in order to obtain reinforced stocks with physical properties superior to those containing significant loadings of any conventional reinforcing filler. For example, using these especially preferred estersils, it is possible to obtain tensile strengths of greater than 4400 pounds per sq. in. and tear strengths greater than 800 pounds per inch.

Siliceous materials in which the ultimate units are so closely packed that they have an average pore size less than about 4 millimicrons in diameter are difficult to disperse by mechanical means such as a conventional rubber mill, irrespective of their degree of esterification; hence, a preferred practice of this invention is the use of siliceous materials having an average pore diameter greater than 4 millimicrons. It will, of course, be remembered that there are some estersils in which the voids between gross particles are not "pores" in the usual sense of the term, as where the siliceous substrate is fibrous, and such materials are not to be excluded from the preferred class even when the average apparent pore size is less than 4 millimicrons.

Although any of the estersils having the properties just described are reinforcing fillers for elastomers, estersils with average length to breadth ratios greater than unity are preferred when it is desired to produce stocks having a high stiffness (i. e., a high modulus of elongation).

A preferred class of estersils is that prepared from the siliceous substrates described and claimed in the copending application of G. B. Alexander, R. K. Iler, and F. J. Wolter, Serial No. 244,722, filed August 31, 1951. These preferred siliceous substrates are pulverulent, dry silica xerogel compositions in the form of super-colloidal aggregates having a specific surface area of from 60 to 400 sq. meters/gram and consisting of dense, substantially uniform sized, amorphous silica spheroids joined together into open packed reticulated structures, the structures being uniformly reinforced with dense amorphous silica, being so openly packed that the oil absorption in milliliters per 100 grams of solid is 1 to 3 times the specific surface area in square meters per gram, and being reinforced to such an extent that the coalescence factor is from 30 to 80%, the silica structures having a uniformity factor greater than 75%.

These silica substrates are particularly advantageous for use in preparing estersils will exhibit excellent reinforcing characteristics in elastomers. These silica substrates are convenient to prepare, since their structure is sufficiently reinforced that they can be dried directly from a solvent, yet at the same time the reinforcement is such that the aggregates can be readily disintegrated and dispersed on a conventional mechanical elastomer mill.

A particularly preferred class of estersils within this group is that having all the properties just described except having a surface area range from 170 to 400 sq. meters/gram.

A variety of formulations used in preparing the estersil reinforced elastomer stocks of this invention are illustrated in the examples. It is to be noted that in these formulations conventional amounts of zinc oxide, stearic acid, antioxidant, and sulfur for soft to semi-hard vulcanizates have been employed. Stocks containing loadings of estersils from 5 to 200 parts by weight are useful in particular applications, depending on property requirements. Below 5 parts by weight, no significant reinforcement of the elastomer stocks is realized; above 200 parts by weight the stocks are generally hard, stiff and non-elastic. For greater general usefulness, it is preferred to use stocks containing loadings of estersils of from 10 to 100 parts by weight per 100 parts of elastomer. Stocks containing more than 10 parts by weight of the estersil are very markedly reinforced and those containing more than 100 parts of estersil by weight are relatively stiff and boardy and find only limited applications.

The quantities of accelerators required to produce full cures of the elastomer stocks containing estersils will depend upon the specific surface area of the estersil, the degree of esterification of the estersil, and the loading of the estersil employed. For example, stocks containing up to 60 parts by weight of an organophilic estersil having a specific surface area of no greater than about 120 square meters per gram may be successfully cured with conventional amounts of a widely used accelerator combination, such as, say, 2 parts MBTS and 0.1 to 0.2 part Thiuram M per 100 parts elastomer by weight. Other conventional elastomer accelerators such as N-cyclohexyl-2-benzothiazole sulfenamide, 3-anilinomethyl-2(3)-benzothiazalethione, and benzothiazyl-thiobenzoate in combination with small amounts of tetramethyl-thiuram disulfide or tetramethyl-thiuram monosulfide may also be used.

On the other hand, optimum cures may be produced in stocks containing up to 100 parts by weight of organophilic estersils having specific surface areas of from about 120 to 400 sq. meters per gram, with approximately double the previous quantities of accelerators. From these disclosures one skilled in the art may readily estimate the accelerator levels required in a particular estersil filled elastomer.

The properties of the estersils may be varied over such a wide range that reinforced elastomer stocks applicable to almost any desired elastomer product may be compounded. Estersils may be produced by proper choice of siliceous substrate and degree of esterification which will yield reinforced elastomer stocks equal or superior to those produced with the best conventional reinforcing fillers, yet, in addition, estersils are substantially colorless and may be used in the preparation of white, nonstaining elastomer products, or products of any desired color. Among the specific uses for the highly reinforced estersil stocks are white or colored tire sidewalls, tire treads, drug sundries, heel and sole stocks, belting, hose and other extruded goods, molded objects, wire and cable insulation, rubber covered rolls, rubber sheet goods (such as white rubber hospital sheeting, innertubes, rubber gloves, bathing caps, carcass stocks (particularly for truck tires), tire curing bags, and the like. The list of uses is not intended to be limited to the present spheres of elastomer application, since the data presented in this patent application indicate that it may be possible to extend the use of reinforced elastomers to entirely new fields of application, through the use of estersils as reinforced fillers.

This application is a continuation-in-part of my application Serial No. 171,760, filed July 1, 1950 now abandoned, and a continuation-in-part of my application Serial No. 130,343, filed November 30, 1949, and is also a continuation-in-part of my application Serial No. 590,728, filed April 27, 1945, the latter two applications now being abandoned.

I claim:

1. A composition comprising a carbon-containing elastomer and a pulverulent solid, said elastomer being selected from the group consisting of natural rubber and synthetic elastomers which at room temperature can be stretched repeatedly to at least twice their original length and upon immediate release of the stress will return with force to their approximate original length, and said solid consisting essentially of substrate particles of inorganic siliceous material in a supercolloidal state of subdivision having chemically bound thereto —OR groups through Si—O—R bonds, wherein R is a hydrocarbon radical containing 2 to 18 carbon atoms and the carbon attached to oxygen is also attached to hydrogen, the substrate particles having an average specific surface area of from 1 to 900 square meters per gram, said solid being organophilic, having a sufficient number of chemically bound —OR groups per unit of substrate surface area to cause them to be preferentially wetted by butanol in a butanol-water mixture.

2. An organic elastomer composition having dispersed therein, per 100 volumes of elastomer, from 5 to 200 volumes of an esterified, finely divided, precipitated, hydrated silica product consisting essentially of substrate particles of silica in a supercolloidal state of subdivision having chemically bound thereto —OR groups through Si—O—R bonds, wherein R is an alkyl radical containing 2 to 18 carbon atoms and the carbon attached to oxygen is also attached to hydrogen, the specific surface area of said silica substrate particles being from 200 to 900 square meters per gram, the esterified silica product having a pronounced organophilic surface character, there being a sufficient number of chemically bound —OR groups per unit of substrate surface area to cause the product to be preferentially wetted by butanol in a butanol-water mixture, and said organic elastomer being selected from the group consisting of natural rubber and synthetic elastomers which at room temperature can be stretched repeatedly to at least twice their original length and upon immediate release of the stress will return with force to their approximate original length.

3. A composition of claim 1 in which the elastomer is an organosiloxane wherein the organo groups are hydrocarbon groups.

4. A composition of claim 1 in which the proportion of pulverulent solid is from 5 to 200 parts by weight per 100 parts by weight of elastomer.

5. A composition comprising a carbon-containing elastomer and, per 100 parts by weight of said polymer, from 5 to 200 parts by weight of a pulverulent solid, said elastomer being selected from the group consisting of natural rubber and synthetic elastomers which at room temperature can be stretched repeatedly to at least twice their original length and upon immediate release of the stress will return with force to their approximate original length, and said solid consisting essentially of substrate particles of inorganic siliceous material in a supercolloidal state of subdivision having chemically bound thereto —OR groups through Si—O—R bonds, wherein R is a hydrocarbon radical containing 2 to 18 carbon atoms and the carbon attached to oxygen is also attached to hydrogen, the substrate particles having an average specific surface area of from 1 to 900 square meters per gram and having chemically bound thereto at least 100 —OR groups per 100 square millimicrons of surface area of the internal structure, whereby the particles are organophilic, being preferentially wetted by butanol in a butanol-water mixture.

6. A composition of claim 5 wherein the specific surface area of the substrate particles is from 25 to 900 square meters per gram.

7. A composition comprising a carbon-containing elastomer and, per 100 parts by weight of said polymer, from 10 to 100 parts by weight of a pulverulent solid, said elastomer being selected from the group consisting of natural rubber and synthetic elastomers which at room temperature can be stretched repeatedly to at least twice their original length and upon immediate release of the stress will return with force to their approximate original length, and said solid consisting essentially of substrate particles of inorganic siliceous material in a supercolloidal state of subdivision having chemically bound thereto —OR groups through Si—O—R bonds, wherein R is a hydrocarbon radical containing 2 to 18 carbon atoms and the carbon attached to oxygen is also attached to hydrogen, the substrate particles having an average specific surface area of from 25 to 900 square meters per gram and having chemically bound thereto at least 100 —OR groups per 100 square millimicrons of surface area of the internal structure, whereby the particles are organophilic, being preferentially wetted by butanol in a butanol-water mixture.

8. A composition of claim 7 wherein the specific surface area of the substrate particles is from 25 to 600 square meters per gram.

9. A composition comprising a carbon-containing elastomer, and, per 100 parts by weight of said polymer, from 10 to 100 parts by weight of a pulverulent solid, said elastomer being selected from the group consisting of natural rubber and synthetic elastomers which at room temperature can be stretched repeatedly to at least twice their original length and upon immediate release of the stress will return with force to their approximate original length, and said solid consisting essentially of substrate particles of inorganic siliceous material in a supercolloidal state of subdivision having chemically bound thereto —OR groups through Si—O—R bonds, wherein R is a hydrocarbon radical containing 2 to 18 carbon atoms and the carbon attached to oxygen is also attached to hydrogen, the substrate particles having an average specific surface area of from 25 to 600 square meters per gram and having chemically bound thereto at least 200 —OR groups per 100 square millimicrons of surface area of the internal structure, whereby the particles are organophilic, being preferentially wetted by butanol in a butanol-water mixture.

10. A composition of claim 9 wherein the specific surface area of the substrate particles is from 200 to 600 square meters per gram and said particles have a porous internal siliceous structure with an average pore diameter greater than 4 millimicrons.

11. A composition comprising a carbon-containing elastomer and, per 100 parts by weight of said polymer, from 10 to 100 parts by weight of a pulverulent solid, said elastomer being selected from the group consisting of natural rubber and synthetic elastomers which at room temperature can be stretched repeatedly to at least twice their original length and upon immediate release of the stress will return with force to their approximate original length, and said solid consisting essentially of substrate particles of inorganic siliceous material in a supercolloidal state of subdivision having chemically bound thereto —OR groups through Si—O—R bonds, wherein R is a hydrocarbon radical containing 2 to 18 carbon atoms and the carbon attached to oxygen is also attached to hydrogen, the substrate particles having a porous internal siliceous structure with an average pore diameter greater than 4 millimicrons, having an average specific surface area of from 200 to 600 square meters per gram, and having chemically bound thereto at least 200 —OR groups per 100 square millimicrons of surface area of the internal structure, whereby the particles are organophilic, being preferentially wetted by butanol in a butanol-water mixture, and are also substantially impervious to methyl red dye.

12. A composition comprising a carbon-containing elastomer and, per 100 parts by weight of said polymer, from 10 to 100 parts by weight of a pulverulent solid, said elastomer being selected from the group consisting of natural rubber and synthetic elastomers which at room temperature can be stretched repeatedly to at least twice their original length and upon immediate release of the stress will return with force to their approximate original length, and said solid consisting essentially of substrate particles of pulverulent, dry, silica xerogel in the form of supercolloidal aggregates which have a specific surface area of from 200 to 600 square meters per gram and consist of dense, substantially uniform-sized, amorphous silica spheroids joined together into open-packed, reticulated structures, the structures being uniformly reinforced with dense, amorphous silica to such an extent that the coalescence factor is from 30 to 80 per cent, being so openly packed that the linseed oil absorption, in milliliters per 100 grams of silica xerogel, is from 1 to 3 times the specific surface area in square meters per gram, and having an average pore diameter greater than 4 millimicrons, said substrate particles having chemically bound to the internal structure, through Si—OR bonds, at least 200 —OR groups per 100 square millimicrons of substrate surface area, wherein R is a hydrocarbon radical containing 2 to 18 carbon atoms and the carbon attached to oxygen is also attached to hydrogen, whereby the particles are hydrophobic and substantially impervious to methyl red dye.

13. A composition of claim 12 wherein the R of the —OR groups has from 2 to 6 carbon atoms.

14. A composition of claim 7 in which the elastomer is a diene polymer.

15. A composition of claim 7 in which the elastomer is an organosiloxane polymer wherein the organo groups are hydrocarbon groups.

16. A composition of claim 11 in which the elastomer is a polymer of a conjugated diene.

17. A composition of claim 12 wherein the R of the —OR groups has from 2 to 6 carbon atoms and the elastomer is natural rubber.

18. A composition of claim 12 wherein the R of the —OR groups has from 2 to 6 carbon atoms and the elastomer is a polyhaloprene.

19. A composition of claim 12 wherein the R of the —OR groups has from 2 to 6 carbon atoms and the elastomer is an organosiloxane polymer wherein the organo groups are hydrocarbon groups.

20. A vulcanized composition of claim 1.

21. A vulcanized composition of claim 1 wherein the elastomer is a polyhaloprene.

22. A vulcanized composition of claim 1 wherein the elastomer is an organosiloxane polymer wherein the organo groups are hydrocarbon groups.

23. In a process for reinforcing an elastomer the step comprising milling into a carbon-containing elastomer a pulverulent solid consisting essentially of substrate particles of inorganic siliceous material in a supercolloidal state of subdivision having chemically bound thereto —OR groups through Si—O—R bonds, wherein R is a hydrocarbon radical containing 2 to 18 carbon atoms and the carbon attached to oxygen is also attached to hydrogen, the substrate particles having an average specific surface area of from 1 to 900 square meters per gram and being organophilic, having a sufficient number of chemically bound —OR groups per unit of substrate surface area to cause them to be preferentially wetted by butanol in a butanol-water mixture, the elastomer being selected from the group consisting of natural rubber and synthetic elastomers which, in the presence of the pulverulent solid can, at room temperature, be stretched repeatedly to at least twice their original length and upon immediate release of the stress, will return with force to their approximate original length.

References Cited in the file of this patent

UNITED STATES PATENTS

| | | |
|---|---|---|
| 2,404,426 | Bechtold et al. | July 23, 1946 |
| 2,433,849 | Lathrop et al. | Jan. 6, 1948 |
| 2,510,661 | Safford | June 6, 1950 |
| 2,564,992 | Pechukas | Aug. 21, 1951 |
| 2,610,167 | Te Grotenhuis | Sept. 9, 1952 |

FOREIGN PATENTS

| | | |
|---|---|---|
| 123,381 | Sweden | Nov. 23, 1948 |

OTHER REFERENCES

Meyer: Natural and Synthetic High Polymers, 2nd edition, Interscience, 1950, pages 533–535.

Houwink: Elastomers and Plastomers, vol. I, Elsevier, 1955, pages 233–235 and 244–246.

Berger: Chem. Weekblad, vol. 38, pages 42 to 43, 1941, abstracted in Chemical Abstracts, vol. 36, 1942, cols. 5734 and 5755.

Meyer: Natural and Synthetic High Polymers, 2nd edition, Interscience, 1950, pages 98, 100, 158, 870, 871.

Le Caoutchoue and La Gutta-Percha, vol. 15, 1938, page 315.